Feb. 27, 1940. H. A. WILCOX Re. 21,377

TRAFFIC ACTUATED CONTROL SYSTEM AND APPARATUS

Original Filed April 15, 1936 5 Sheets-Sheet 1

INVENTOR
HARRY A. WILCOX
BY Edwards, Bower & Pool
ATTORNEYS

Feb. 27, 1940. H. A. WILCOX Re. 21,377

TRAFFIC ACTUATED CONTROL SYSTEM AND APPARATUS

Original Filed April 15, 1936 5 Sheets-Sheet 2

INVENTOR
HARRY A. WILCOX
BY Edwards, Bower & Pool
ATTORNEYS

TRAFFIC ACTUATED CONTROL SYSTEM AND APPARATUS

Original Filed April 15, 1936 5 Sheets-Sheet 3

Fig. 4.

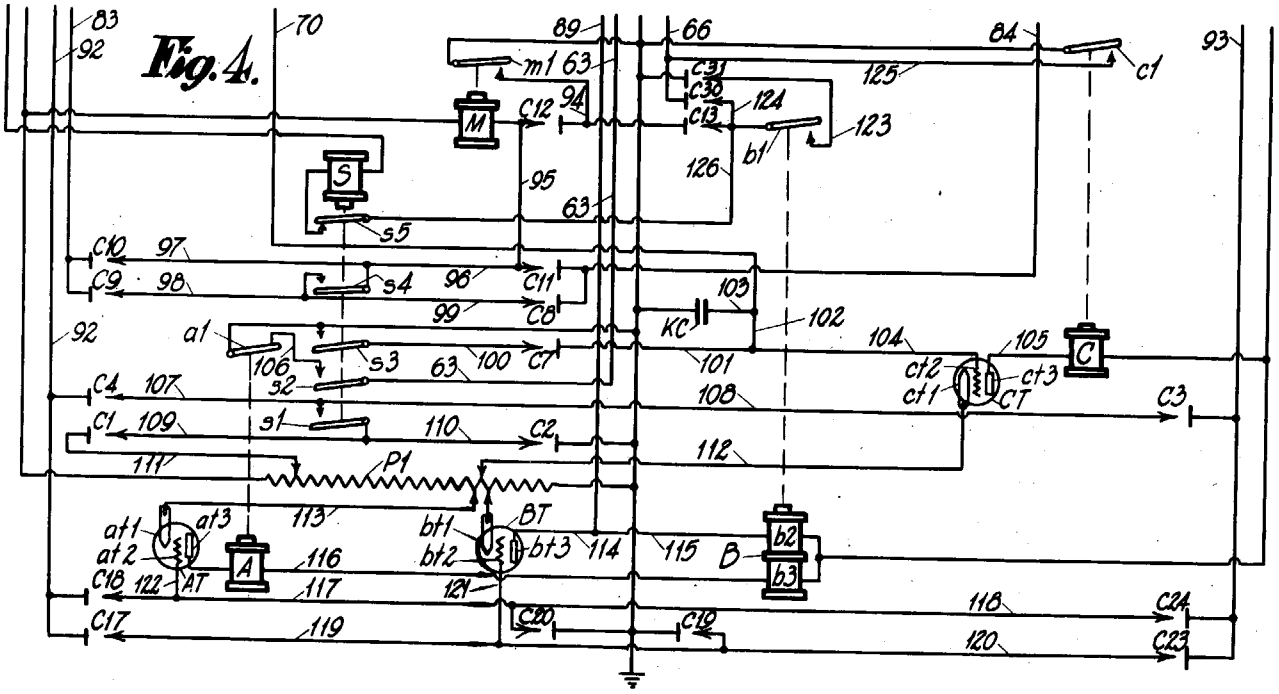

| | Cam Contact Numbers 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | Camshaft Position | Interval | Signal Indications |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | | X | | X | | | | | | | X | X | | | | X | | X | X | | | | | | X | | | | X | | X | | | | | | X | X | X | | | | | 1 | NS Initial | NS Green-EW Red |
| 2 | | | | | | | X | | | | X | X | X | | X | | | X | X | | | | | | X | | | | X | | | | | | | | X | X | X | | | | | 2 | NS Rest | NS Green-EW Red |
| 3 | X | | | X | | X | X | | X | | | | | | X | | | X | | | | | X | | X | X | | | | X | X | | | X | | | | X | X | | | | | 3 | NS Traffic Timed | NS Green-EW Red |
| 4 | | | | | | | X | | | X | | X | | X | | | | | X | X | | | | | X | | | | | X | | X | | | | | | | X | X | | | | 4 | NS. Amber | NS Amber-EW Red |
| 5 | | X | X | | | | | | | X | | X | | X | | | | | X | | X | | | X | | | | X | | | X | | | | | X | | | | | X | X | | 5 | EW Initial | NS Red-EW Green |
| 6 | | | | | | | X | | | X | | X | X | X | | | | | X | | | X | | X | | | | X | | | | | | | | X | | | | | X | X | | 6 | EW Rest | NS Red-EW Green |
| 7 | X | | X | | X | | X | X | | | | | | X | | | X | | | | | X | | X | | | X | | | X | X | | | | X | | | | | | X | X | | 7 | EW Traffic Timed | NS Red-EW Green |
| 8 | | | | | | | X | | | | X | X | | X | | | | | X | X | | | | | X | | | | | X | | | X | | | | | | | | | X | X | 8 | EW Amber | NS Red-EW Amber |

INVENTOR
HARRY A. WILCOX
BY Edwards, Bower & Pool
ATTORNEYS

Feb. 27, 1940. H. A. WILCOX Re. 21,377

TRAFFIC ACTUATED CONTROL SYSTEM AND APPARATUS

Original Filed April 15, 1936 5 Sheets-Sheet 4

INVENTOR
HARRY A. WILCOX
BY Edwards, Bower & Pool
ATTORNEYS

Feb. 27, 1940. H. A. WILCOX Re. 21,377

TRAFFIC ACTUATED CONTROL SYSTEM AND APPARATUS

Original Filed April 15, 1936 5 Sheets-Sheet 5

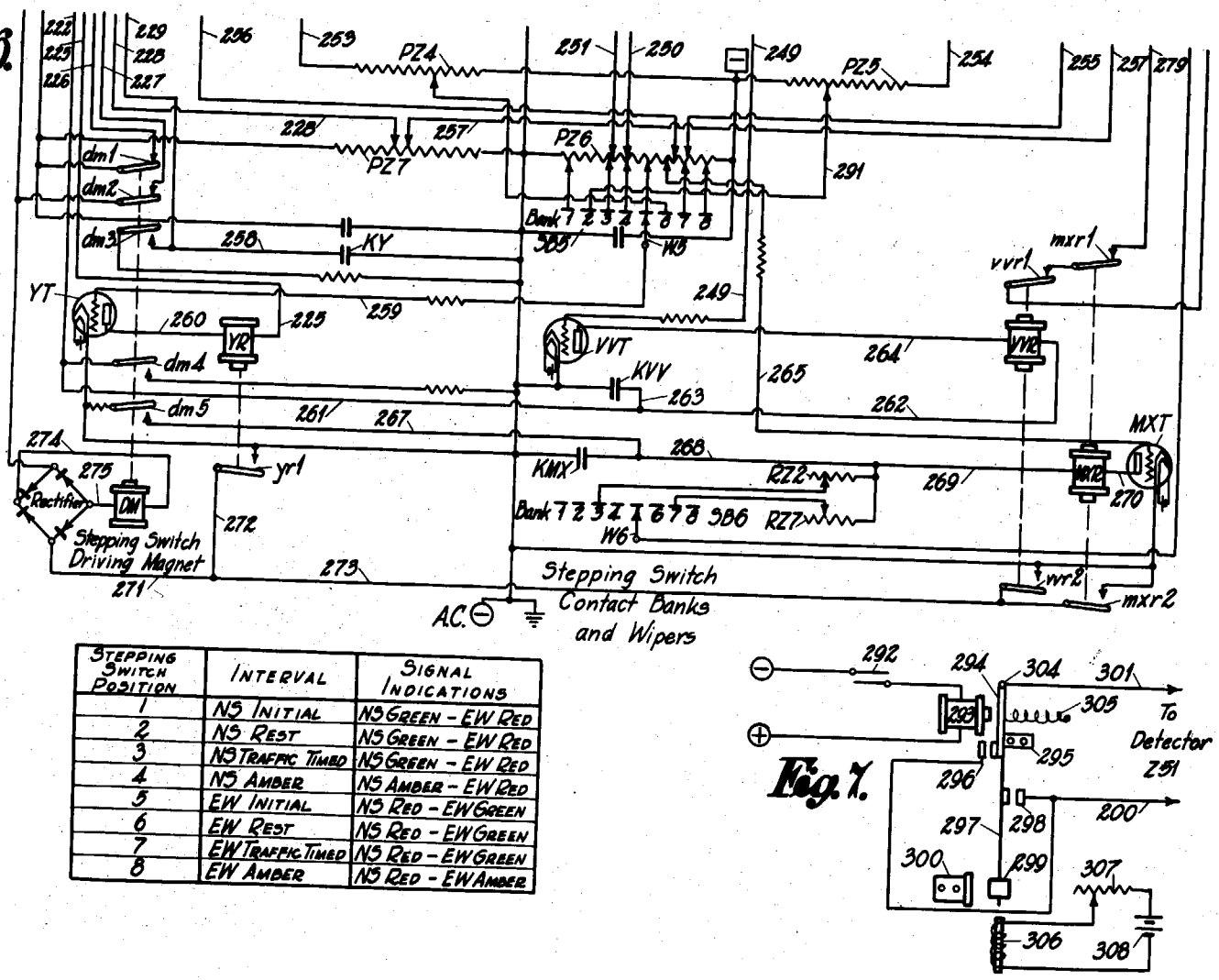

| Stepping Switch Position | Interval | Signal Indications |
|---|---|---|
| 1 | NS Initial | NS Green - EW Red |
| 2 | NS Rest | NS Green - EW Red |
| 3 | NS Traffic Timed | NS Green - EW Red |
| 4 | NS Amber | NS Amber - EW Red |
| 5 | EW Initial | NS Red - EW Green |
| 6 | EW Rest | NS Red - EW Green |
| 7 | EW Traffic Timed | NS Red - EW Green |
| 8 | EW Amber | NS Red - EW Amber |

INVENTOR
HARRY A. WILCOX
BY Edwards, Bowers & Pool
ATTORNEYS

Reissued Feb. 27, 1940

Re. 21,377

UNITED STATES PATENT OFFICE 21,377

TRAFFIC ACTUATED CONTROL SYSTEM AND APPARATUS

Harry A. Wilcox, Norwalk, Conn., assignor to Automatic Signal Corporation, New York, N. Y., a corporation of Delaware Original No. 2,183,780, dated December 19, 1939, Serial No. 74,422, April 15, 1936. Application for reissue December 28, 1939, Serial No. 311,390

23 Claims. (Cl. 177—337)

This invention relates to a traffic system capable of use at the intersection of two traffic lanes or streets, and has for its general object to provide an automatic system by means of which traffic will be expeditiously and safely handled. This system is to a large extent controlled by the traffic along the intersecting lanes. Its operation will be responsive not only to the presence of traffic but will be affected also by the density of traffic in each lane. Previous systems to my knowledge have provided for traffic actuation of the signals but have less completely taken into account the element of the relative density of traffic in the two lanes when traffic is very heavy.

The vehicle actuated traffic control is not in itself a new invention, such systems having been in general use for some time. Previous systems have served admirably to control traffic at the intersection of two lanes when traffic is light in one lane and heavy in the other, or when traffic is irregularly spaced in one or both of said lanes, but they have not been adapted so well to the most efficient handling of intersections where traffic is continuously heavy in both lanes. A system to be effective under this latter condition must be sensitive to slight difference between two heavy traffic flows.

The system disclosed herein handles efficiently any type of traffic but is especially effective in handling heavy traffic with the utmost efficiency. This system is of the type in which within a maximum limit each vehicle approaching the intersection on a "go" signal after an initial interval which is preferably inserted as described below extends the period of display of such signal for a time after its approach, such time being designated as a vehicle protection period, right of way extension period, or vehicle interval.

Unlike the prior systems of this type the vehicle interval in this new system is decreased in accordance with the number of vehicles awaiting on the cross lane. Hence, with a large group of vehicles waiting on the cross lane, each vehicle entering the intersection from the lane in which the "go" signal is being displayed is allotted a shortened time period for its passage. As a result of this fact a shorter spacing between vehicles in the moving line will yield the right of way. Therefore under the system disclosed herein a large number of waiting vehicles is more effective than a small number to cause transfer of the right of way to the lane in which they are waiting. This invention therefore provides a system in which the right of way tends to revert more quickly to the lane having the denser traffic thereby providing for maximum efficiency in handling heavily travelled intersections where efficiency is of the greatest importance. In effect it provides means whereby waiting traffic is able to exert a forcing effect to obtain the right of way sooner in accordance with its demand.

This system, like previous vehicle actuated traffic control systems, includes "stop" and "go" signals to be displayed in each traffic lane entering an intersection, a control mechanism to operate the "stop" and "go" signals, and traffic detectors located in the aforementioned traffic lanes, which effect the operation of the control mechanism in such a manner as to cause the signal display periods to conform to the requirements of the traffic approaching the intersection. In this system as in the prior types of vehicle actuated systems the actuation of a traffic detector in a traffic lane in which the stop signal is being displayed causes the right of way to be transferred to that lane at the first opportunity. If there is no traffic entering the intersection from the lane in which the "go" signal is being displayed a caution signal is usually immediately displayed in said lane and after a short period the right of way is transferred to the lane in which the "stop" signal was being displayed.

If traffic is moving in the lane wherein the "go" signal is being displayed the actuation of the traffic detector in the lane in which the "stop" signal is being displayed causes the right of way to be transferred thereto at the first break of a predetermined time in the said moving traffic. If no such break occurs in said moving traffic the right of way will be transferred at the end of a predetermined maximum period usually provided by a different timing element.

In this system as in previous systems, the actuation of a traffic detector during the period in which the "go" signal is being displayed to the lane wherein said traffic detector is located causes such "go" signal period to be extended under certain conditions. The "go" periods for each traffic lane is divided into two parts. During the first part of this period the actuation of the traffic detector in the lane in which the "go" signal is being displayed is of no effect. This first part of the "go" period, called the "initial interval", is introduced to allow time for standing traffic to get into motion. While not essential to operation this initial interval is preferably introduced to increase the efficiency of the system. After the expiration of the initial interval the "go" signal will continue to be displayed for an interval of time at least sufficient for a moving vehicle to progress from the traffic detector thru the intersection. This last named interval has been identified above as the "vehicle interval". During the "vehicle interval" the actuation of a traffic detector in the lane in which the "go" signal is being displayed extends the right of way period therein for a time interval reasonably sufficient to allow the vehicle which actuated the traffic detector to progress from said detector thru the intersection.

The system disclosed herein however includes a new and important feature in that the timing of the vehicle interval is affected by the number of waiting vehicles in the cross lane as mentioned before so that as the group of waiting vehicles increases in number the control will take advantage of shorter and shorter breaks in the moving traffic to transfer right of way to these waiting vehicles.

Furthermore this system includes another new feature in that it provides that if desired certain forms of traffic such as trolley cars, fire apparatus, etc., to which it may be advisable to accord preferred treatment can thru actuating special detectors have the same effect on the timing of the signals as several ordinary vehicles.

This system, like some previous traffic actuated systems is arranged so that the timing of the "initial interval", the first part of the "go" period, can, before the beginning of said "initial interval", be preadjusted between a predetermined minimum value and a predetermined maximum value, by successive actuations of the traffic detector in the lane in which the "stop" signal is being displayed so that when said lane shall next be given the "go" signal the "initial interval" of said "go" signal display period will be timed in conformance with the volume of the traffic waiting in said lane, to the end that a large number of waiting vehicles will be granted a longer initial interval than will be granted to a small number. However in the system described herein the variable initial interval is achieved by a method using simpler and more reliable equipment than that used in previous systems, as will be more specifically shown later.

In this system the traffic detectors can be located at a distance from the intersection customary in the prior systems but it is entirely feasible, especially if the variable initial interval is employed, to locate them considerably farther from the intersection (two or three hundred feet or more for example) thereby facilitating the counting of larger numbers of waiting vehicles which will increase the effectiveness of traffic approaching a "stop" signal in controlling the signal timing.

With the system adjusted to give a pronounced reduction of the vehicle interval after the accumulation of a certain amount of traffic approaching a "stop" signal a considerable degree of coordination between adjacent intersections can be obtained solely by the pressure of traffic itself without any electrical interconnection since the effect of a group of vehicles approaching successive intersections equipped with this system will be to so reduce the vehicle interval for cross traffic at each intersection as at any time subsequent to the cross street initial interval to practically seize the right of way at intersection after intersection thereby favoring uninterrupted progress to a sufficiently large compact group of vehicles.

Cross traffic will however be protected against unreasonable interruption since the cross street initial interval is timed in advance in accordance with the number of vehicles waiting on the cross street and is not reducible by main highway traffic, and in addition either a maximum limit to right of way on the main highway or a reduction of the main highway vehicle interval by accumulation of waiting cross street traffic, or both, serve to protect the cross street traffic.

The coordination effect outlined above will be obtained by a compact group of vehicles whether they move along one street or follow an irregular path through an area which is a considerable advantage over prior non-vehicle actuated coordinated systems in which coordination was necessarily arranged to favor the passage of traffic along a predetermined route.

Under this system while a compact group of vehicles is crossing its path, scattered traffic is automatically given the opportunity to come into close order through a natural accumulation. Hence when this system is applied to a large area constituting a grid of individually and independently controlled intersections traffic will form into compact groups at the outlying intersections and then pass thru the grid as favored units thereby causing the controls throughout the whole area to function as a coordinated grid system without the necessity for any electrical interconnection between intersections.

It will be appreciated that traffic is often heavier inbound toward the central area of a city in the morning and heavier outbound in the afternoon, and that in such cases the automatic natural coordination effect above noted with this invention will be particularly pronounced on the main traffic arteries.

It is an object of this invention to provide an improved traffic control system wherein the functioning of the apparatus will automatically take into account the relative densities of traffic in the two roadways in determining the signal timing.

Another object is to provide an improved system in which the denser traffic is favored, but in which the right of a single vehicle or a scattered group of vehicles to pass the intersection is not by any means permanently withheld. A single waiting vehicle will be given an opportunity to pass within a reasonable period after its approach to the intersection even though moving cross traffic may be continuous. If there is no cross traffic such a vehicle will be given the right of way immediately upon its approach.

It is another object to provide a system in which vehicles awaiting the right of way in one lane will facilitate yielding the right of way from the other roadway by reducing the time allotted to each vehicle entering the intersection from such other roadway.

It is a further object to provide a system in which vehicles awaiting the right of way in one roadway will reduce substantially in proportion to the number of said waiting vehicles, the time allotted to each vehicle entering the intersection from the other roadway in which the "go" signal is being displayed thereby automatically permitting a large amount of waiting traffic to take the right of way more easily than a small amount.

It is also an object of the invention under some conditions to reduce substantially the vehicle protection interval on one street after sufficient traffic has accumulated on the opposite street.

It is another object of this invention to provide a system in which waiting traffic will automatically and substantially in proportion to its volume preadjust, by controlling the starting point, the timing of the following preliminary right of way period.

It is a further object to provide a system in which waiting traffic will automatically and substantially in proportion to its volume preadjust the duration of the following right of way period by changing the starting point of this timing period in accordance with the number of vehicles approaching the intersection against the stop signal.

It is also an object of this invention to provide a system in which the variation of charge in a condenser is instrumental in timing the "go" periods and in which vehicles approaching the intersection against the stop signal will preadjust the timing of the following "go" period thru varying in accordance with the number of such vehicles the initial charge in said condenser at the beginning of the said following "go" period.

It is another object to provide an improved system in which the right of way will be automatically returned to a traffic lane later if said right of way was last withdrawn from that lane by the maximum timer less than a predetermined time after the last traffic actuation of a detector in that lane.

It is still another object to provide a system in which the right of way will automatically be returned to a traffic lane at the first reasonable opportunity if, when the right of way is withdrawn, the vehicle interval allotted to vehicles in that lane is thru the action of waiting cross traffic or otherwise decreased to less than a predetermined time period.

Another object is to provide a system which can be arranged so that several adjacent intersections under this type of control will operate as a coordinated group or grid so as to facilitate the formation and passage of a large compact group of vehicles thru this group or grid in any path solely thru the pressure of traffic without any electrical interconnection among the intersections.

It is also an object to provide a system in which if desired certain forms of traffic such as fire apparatus or trolley cars can have a multiple effect in timing the signals so that one actuation by such a vehicle can have the same effect as several actuations by ordinary vehicles.

The invention is designed to encourage the closing up of scattered traffic which may wish to cross the path of dense traffic thereby effecting high efficiency in the use of one intersection or a group of intersections. However such scattered traffic is never forced to come into close order unless the right of heavier cross traffic requires this procedure. Hence the system operates to procure the greatest good to the greatest number without unduly sacrificing the right of any.

The invention is exemplified in and will be particularly described in connection with the accompanying drawings, in which.

Figure 3:
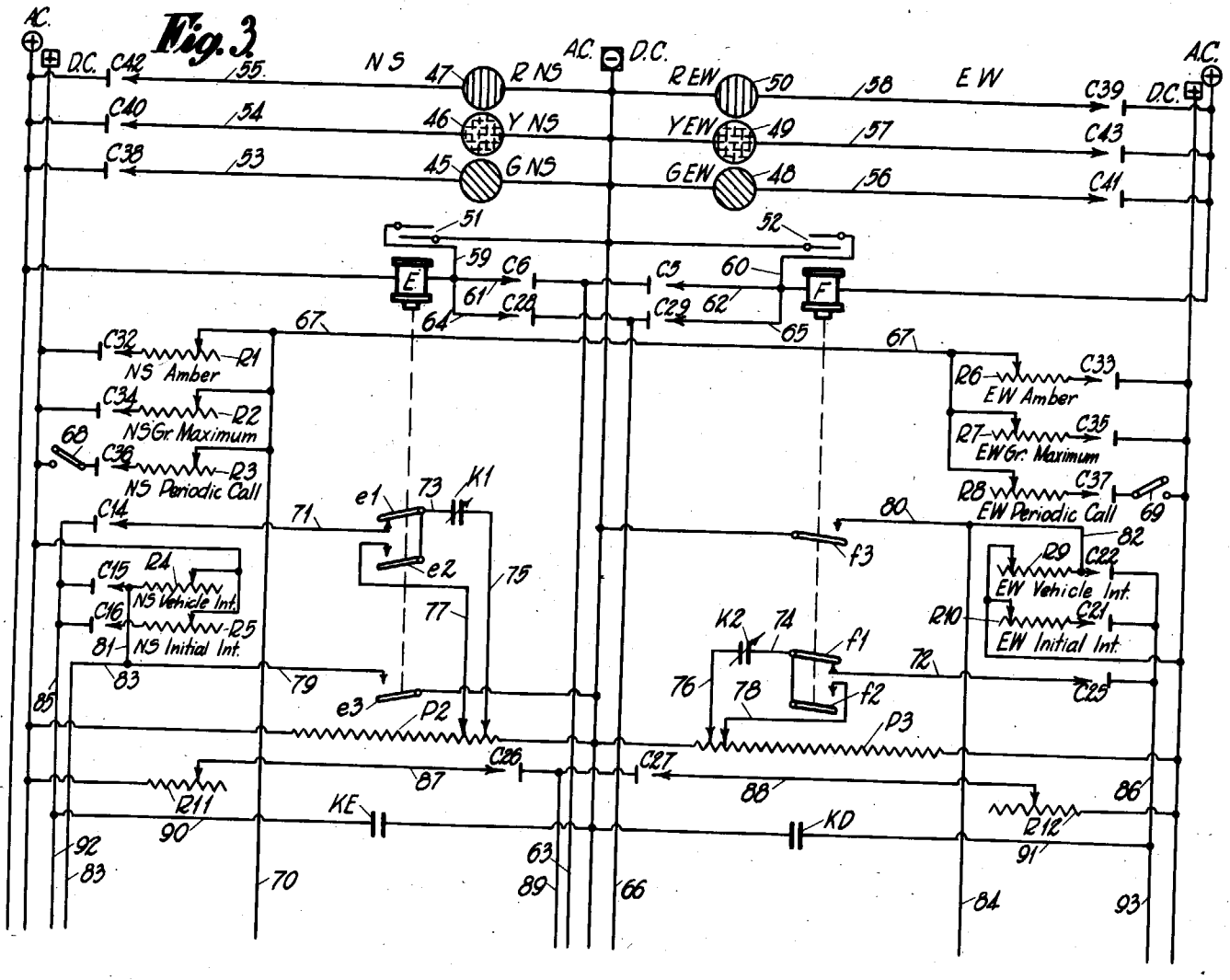

Figures 3 and 4 together comprise a circuit diagram of one form of apparatus embodying my invention including timing apparatus with connections to signals and traffic detectors.

Figures 5 and 6 show a circuit diagram for an alternative and in some respects preferred form of apparatus embodying my invention and employing a somewhat different form of timing apparatus with its connection to signals and traffic detectors.

Figure 7:
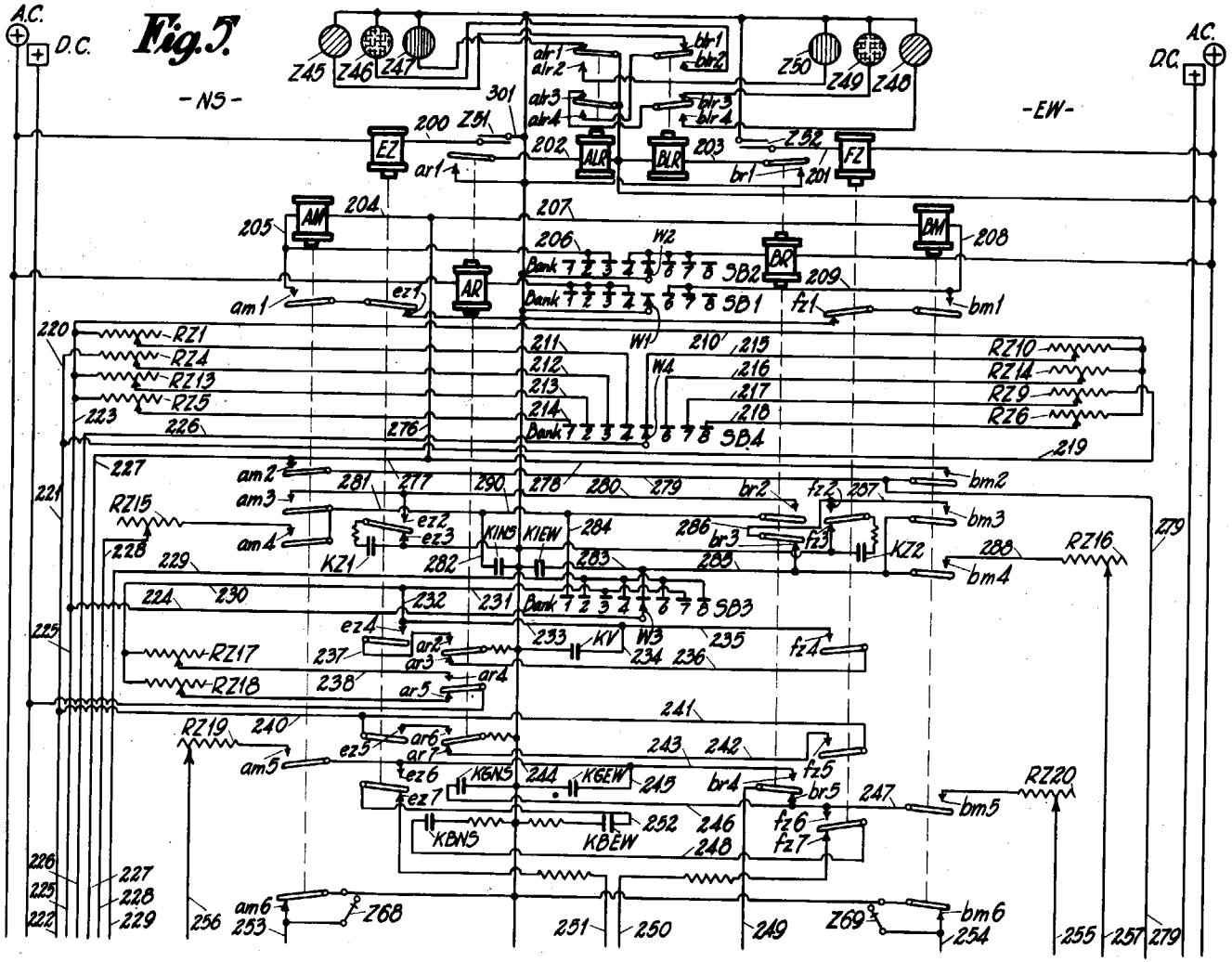

Figure 7 is a schematic diagram of a form of special detector equipment by means of which preferred traffic can exert a multiple effect on the timing apparatus.

Figure 1:
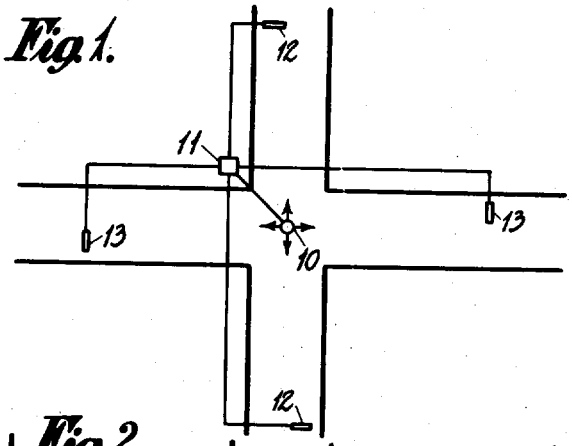
Figure 1 is a plan view of an intersection showing the location of traffic detectors, signals and timer housing.
Figure 2:
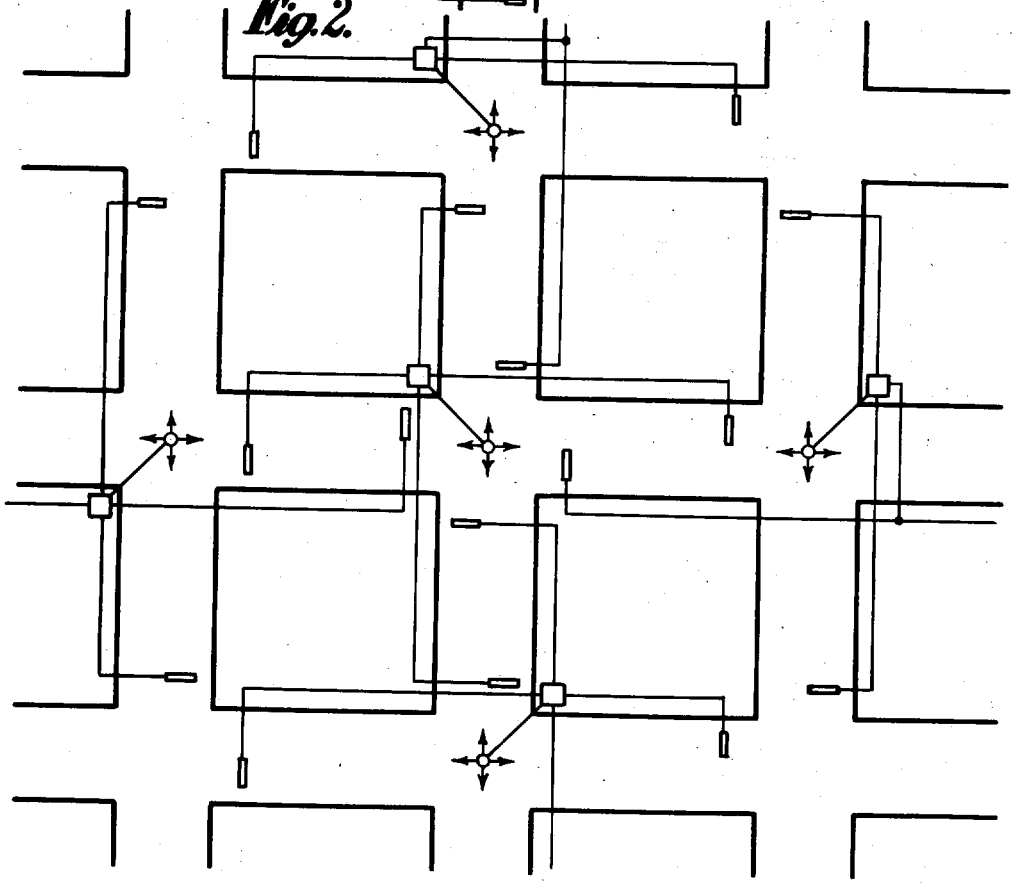
Figure 2 is a plan view of a group of adjacent intersections equipped with this system showing one example of the location of signals, traffic detectors and timer housings.

The traffic detectors for each intersection in the mesh or group shown in Fig. 2 are located at a considerable distance from the intersection so that the presence of a large group of vehicles can be detected for the purpose of according preference thereto as heretofore mentioned in the discussion of the coordination effect of a group of non-interconnected intersections equipped with this system.

Any type of visual or audible signal can be used in this system but the customary red, yellow and green traffic lights are preferable inasmuch as motorists and pedestrians are now generally familiar with the significance of these colored lights.

The traffic detectors may be of any desired form such as a mechanical switch in which the pressure exerted by the weight of a passing vehicle flexes a resilient plate to make a contact, or an energy beam is directed across a traffic lane so as to be interrupted by traffic approaching the intersection. A common form of the latter type is a light beam directed across a traffic lane with a photoelectric cell arranged as a receiver. Still another type of detector is an electromagnetic device in which the vehicle disturbs a magnetic field and thereby operates a relay in the control. Any of these or other types of traffic detectors such as a push button for use of pedestrians will operate satisfactorily in this system.

The timer mechanism shown in Figs. 3 and 4 herein which controls the signals and is responsive to the traffic detectors is of the type in which cams, fixed on a shaft which is revolved in steps by a solenoid with a ratchet and pawl mechanism or other suitable means, operate contacts to control the signal indications and to connect the various timing units in the timer circuit properly for the particular point in the signal cycle prevailing.

The cam shaft used in this system employs eight steps to complete one revolution which carries the signal indication thru one complete cycle, that is, from a go indication in one lane thru the go indication on the cross lane and thence back to the go indication on the first lane.

In the embodiment shown in Figs. 3 and 4 the timing of the various intervals is accomplished by means of apparatus including three element thermionic tubes arranged to be influenced by traffic approaching the intersection. A direct current relay is connected in the plate circuit of each tube in such a way that the plate current passes thru an operating coil of this relay. With constant plate voltage and constant plate external circuit resistance the plate current is controlled by the grid voltage of the tube in the manner usual in amplifier type thermionic tubes. With the grid markedly negative with respect to the filament substantially no plate current flows. If the grid voltage is made less negative the plate current increases.

A condenser is included in each grid circuit. The voltage of each grid is controlled by the charge on the condenser associated therewith. When a grid condenser is sufficiently charged, the plate current will become great enough to operate the relay thru which it passes. Hence by controlling the starting charge and the rate at which charge is added to or subtracted from the grid condenser, each tube can be made to operate the relay associated with it at the end of a longer or shorter period.

Figures 3 and 4 are complementary. In both figures the contacts identified by the capital letter C followed by a numeral are operated by cams mounted on a common cam shaft. This shaft is rotated by action of the solenoid S shown schematically in Fig. 4. The contacts identified by the letter S followed by a numeral are operated directly by the solenoid S. Each time the solenoid rises in its stroke each of these contacts is changed from its normal condition of closed or open to the opposite condition. As the solenoid returns to its position of rest these contacts return to their normal unoperated conditions. Each cycle of operation of the solenoid including forward stroke on energization and return stroke on de-energization rotates the cam shaft through 45 degrees.

Eight steps of the shaft complete one revolution during which the signals 45 to 50 inclusive in Fig. 3 go thru one complete cycle of changes, i. e., from green in one street thru green in the cross street, back to green in the first street. The table at the bottom of Figure 4 indicates which cam contacts are closed in each of the eight positions of the cam shaft. An X in a square indicates that the contact whose number is at the top of the particular column including that square is closed when the shaft is in the position identified by the number at the end of the horizontal row passing thru that square.

The cam shaft positions are numbered from 1 to 8 as indicated in the table in Figure 4. When the cam shaft is in positions 1, 2 and 3 the green signal 45 is displayed to N—S traffic, when in position 4 the amber or warning signal 46 is displayed to N—S traffic, and when the cam shaft is in positions 5, 6, 7 and 8 the red signal 47 is displayed to N—S traffic. The E—W green signal 48 is displayed while the cam shaft occupies positions 5, 6 and 7, the E—W amber signal 49 is displayed in cam position 8 and the E—W red signal 50 in cam positions 1, 2, 3 and 4. Other signal display sequences can of course be provided by this apparatus but this particular one is cited because it is in quite general use in traffic control systems.

In Figures 3 and 4 negative power is supplied thru the wire designated by a minus sign enclosed in a circle and a square which signifies a common grounded negative for both A. C. and D. C. Positive A. C. is supplied through wires designated by a plus sign in a circle, and positive D. C. thru wires designated by a plus sign in a square.

Referring to Figure 3, the apparatus represented by that part of the drawing to the right of the negative power wire is in general effective to cooperate with the apparatus of Fig. 4 to call the right-of-way to the E—W lane and to hold the right of way thereon. In like manner the apparatus represented by that part of Fig. 3 to the left of the negative power wire is effective to cooperate with the apparatus of Fig. 4 similarly to call or hold the right of way on the N—S lane.

At the top of Fig. 3 are shown the two sets of signals representing the customary green, yellow and red lights, numbers 48 to 50 being displayed to the E—W traffic whereas numbers 45 to 47 are displayed to the N—S traffic.

The traffic detectors located respectively in the N—S and E—W lanes are represented by 51 and 52. Relay E is responsive to actuations of detector 51 and relay F operates in response to actuations of detector 52.

The operation of relay F starts a sequential operation which calls the right of way to the E—W lane and when the right of way has been given to the E—W lane, operation of this relay tends to hold it there. Similarly relay E operates to call and hold the right of way on the N—S lane.

Relay M cooperates with relays E and F in calling the right of way as mentioned above and is also effective thru cooperation with relay A and a contact of solenoid S to cause right of way to return to a given lane later if, when right of way last left this lane the vehicle protection interval was shorter than a predetermined period, or if a detector was actuated thus initiating a new vehicle interval in this lane within a predetermined time previous to the yielding of the right of way to the cross lane.

Relay C cooperates with tube CT and condenser KC to time all the intervals which remain constant during successive signal cycles such as the amber period for each lane (cam shaft in position 4 or 8) and the maximum period during which traffic can hold the right of way on either street against a cross lane call (cam shaft in position 3 or 7). In addition if switch 69 is closed relay C, tube CT and condenser KC will cooperate to call the right of way to the E—W lane a predetermined time after said right of way last left the E—W lane, and closure of switch 68 will in a like manner cause relay C, tube CT and condenser KC to call the right of way to the N—S traffic lane a predetermined time after the right of way last left the N—S lane. This effect is termed the "periodic call".

By opening or closing switches 68 and 69 the apparatus can be caused to normally operate as a reverting, arterial or floating system. The closure of both switch 68 and switch 69 will in the absence of traffic cause the right of way to normally revert periodically from lane to lane. This system of operation is commonly called the reverting system.

If switch 68 is closed and switch 69 is open a N—S arterial system results in which the right of way will normally remain on the N—S lane until called by traffic to the E—W lane. After the E—W traffic has cleared the intersection the right of way will automatically revert to the N—S lane. In the event of continuous E—W traffic under the above system the right of way will periodically revert to the N—S lane, and remain there as long as N—S traffic may require it up to a predetermined limit.

If switch 69 is closed and switch 68 open the system will operate arterial E—W under which system the E—W lane instead of the N—S lane will be the artery. The right of way will normally remain on the E—W lane until called by traffic to the N—S lane, from which lane it will revert to the E—W lane when the N—S traffic has cleared the intersection or has held the right of way on the N—S lane for a predetermined time.

If switches 68 and 69 are both open the apparatus will operate as a floating system under which the right of way will normally remain on the lane to which it was last called until traffic on the cross lane requires it.

Under all of these systems of operation traffic on each lane can hold the right of way up to a predetermined period against waiting traffic in the cross lane and in addition automatically put in a call for the return of the right of way to the lane from which it is being transferred if at the time of such transfer a vehicle interval has been initiated by a detector actuation in said lane within a predetermined time prior to said transfer of the right of way or if the vehicle interval prevailing thereon at the time of such transfer has by waiting cross traffic been reduced to less than a predetermined magnitude.

The cooperative action of relay C, tube CT, and condenser KC which time all intervals which do not vary from cycle to cycle is as follows: Condenser KC during each of these various intervals is being charged thru a fixed resistance, one of the several indicated in the right or left side of Fig. 3. As this charge increases the voltage of the grid *ct2* of tube CT to which condenser KC is connected increases. Hence the plate current of tube CT increases. When this current reaches a sufficient magnitude relay C operates which in turn operates the solenoid S to move the cam shaft into its next position.

In a generally similar manner tubes AT and BT are associated with condensers KD and KE and with relay B, which is a double coil relay, to time the initial and vehicle intervals which vary in their timing from cycle to cycle in accordance with the requirements of traffic. Coil *b3* of relay B is its main operating coil. Boil *b2*, the bucking coil, is connected so that its magneto-motive force opposes that of coil *b3* and therefore modifies the effectiveness of coil *b3* to operate relay B. In order to insure that the bucking coil *b2* shall under no circumstances operate relay B its magneto-motive force should always be less than that required to operate relay B or as an alternative said relay B might be of the polarized type in which case no limit need be placed on the magneto-motive force of coil *b2*. Current flows thru coil *b2* only when the cam shaft is in position 3 or 7, the N—S and E—W traffic timed positions, since in all other positions of the cam shaft the grid of tube BT is biased negative to such a degree that substantially no plate current flows in this tube or in coil *b2* of relay B.

With the cam shaft in position 3 or 7 the current thru the bucking coil *b2* is regulated in accordance with previous actuations of the detector in the lane in which the "stop" signal is displayed, in such a way that this current is caused to be less than a predetermined maximum by an amount substantially in accordance with the volume of the waiting cross traffic. This effect is the means by which waiting cross traffic decreases substantially in accordance with its volume the timing of the vehicle interval in the lane in which the "go" signal is being displayed.

The current thru operating coil *b3* when the cam shaft is in position 3 or 7 is affected by actuation of the detector in the lane in which the "go" signal is being displayed in such a way that a new vehicle interval is initiated for each actuation of a detector in this lane. Therefore it can be seen that traffic in both lanes affects the operation of relay B to time the vehicle interval for each lane in accordance with the traffic requirements of both lanes.

Resistances R11 and R12 provide by-passes around coil *b2* of relay B, which are adjustable to control the effectiveness of tube BT in modifying the operation of relay B to the end that waiting cross traffic can be caused to have a greater or less effect on the timing of the vehicle interval. In a network of intersections equipped with this system these by-pass resistances could be adjusted to a high value in order to increase markedly the effect of waiting cross traffic in decreasing the vehicle interval to aid in emphasizing the coordination effect naturally inherent in a group of adjacent intersections equipped with this apparatus.

Tube AT, as mentioned above, also cooperates thru the coil of relay A with coil *b3* of relay B, condensers KE and KD, to time the initial intervals, cam shaft position 1 or 5, substantially in proportion to the number of vehicles waiting in the lane in which the "go" signal is displayed at the beginning of such interval. During the initial intervals coil *b2* of relay B carries no current due to the negative bias of grid *bt2* of tube BT. Hence coil *b3* alone is effective to control relay B during the initial intervals.

Relay A is effective to cooperate thru solenoid and cam shaft contacts S2, C5, and C6 to operate relay E or relay F which will in turn operate the memory relay M to call the right of way to the lane from which it is being transferred if, at the time of such transfer, the vehicle interval prevailing on said lane is less than a predetermined time or if the right of way is transferred by action of the maximum timer less than a predetermined time after a vehicle interval has been initiated by a detector actuation in said lane from which the right of way is being transferred. If either of these named conditions prevail relay A will be unoperated at the time the cam shaft moves into position 4. Therefore during this movement armature *a1* of relay A thru its back contact and solenoid contact S2 complete a "recall circuit" to operate the memory relay M and thus cause the right of way to return later to the lane from which it is being transferred just as if a vehicle detector in this lane had been actuated.

To more completely explain this system I shall now describe in detail its operation to carry the signals thru one complete cycle.

Relay E is operable in all cam shaft positions upon actuation of the N—S vehicle detector 51 which completes a circuit from negative power, thru detector 51 and wire 59 to the coil of relay E thence to positive power. Similarly relay F is operable in all cam shaft positions upon actuation of the E—W vehicle detector 52 which completes a circuit from negative power thru detector 52 and wire 60 to the coil of relay F thence to positive power. The effect produced by the operation of these relays is different in different cam shaft positions as will be pointed out in the following description of the operation of the system.

Assume that the cam shaft is in position 2, called the N—S rest position. The N—S go signal 45 is energized thru wire 53 and cam contact C38. The E—W stop signal 50 is energized thru wire 58 and cam contact C39. Condenser KE which cooperates with tube AT and relay B to time the N—S vehicle interval is being charged thru the following circuit. Positive power thru resistance R4, contact C15, wires 85 and 90 to condenser KE thence to negative power. While the cam shaft is in position 2 condenser KE is subject to discharge at each vehicle actuation of detector 51 thru the operation of relay E. The subsequent recharge period of condenser KE constitutes the vehicle interval for the passage thru the intersection of the vehicle in the N—S lane which caused the operation of relay E. This discharge circuit for condenser KE goes from negative power to armature e3 of relay E, wires 79, 81, contact C15, wires 85 and 90 thru condenser KE and thence back to negative power.

In this cam shaft position condenser KE which as before mentioned cooperates with tube AT and relay B to time the N—S vehicle interval is connected to the grid at2 of tube AT thru wires 90, 92 contact C18 and wire 122. Hence the voltage of condenser KE is effective to control the plate current of tube AT. This plate current passes thru coils of relays A and B thru a circuit starting at negative power, thru potentiometer resistance P1, wire 113, filament at1 and plate at3 of tube AT to relay A thence thru wire 116 to coil b3 of relay B to positive power. Coil b2 of relay B carries no current while the cam shaft is in position 2 since the grid bt2 of tube BT is biased sufficiently negative with respect to filament bt1 thru wires 121, 120 and contact C19 to prevent any plate current from flowing in tube BT.

When condenser KE is charged to a sufficient voltage the plate current of tube AT which passes thru coil b3 will be great enough to operate relay B. When condenser KE has further charged to a still higher predetermined voltage the plate current of tube AT will further increase thus causing relay A to operate. While the cam shaft remains in position 2 the operation of relay A or relay B is of no effect since their armatures whether operated or not operated do not affect any circuit. Relays A and B will however function when the cam shaft has moved into position 3 as will be explained later.

Movement of the cam shaft into position 3, called the N—S traffic timed position, is made in response to a cross lane call resulting either from a vehicle actuation of the E—W detector 52, or by action of the E—W periodic call circuit if the system is set to normally revert to the E—W lane, as would for instance be the case if the system were set to revert periodically from street to street or if the E—W lane were the main highway of an arterial system.

An E—W detector actuation will cause this cam shaft movement as follows: The operation of the E—W detector 52 will complete the circuit of relay F from negative power to positive power thru wire 60. The operation of relay F will energize relay M thru a circuit starting at negative power thru armature f3 of relay F, wires 80, 84, contact C11, wire 95 to coil of relay M thence to positive power. Relay M will thereupon operate and lock in thru the circuit starting at negative power thence thru armature m1 of relay M, wire 94, contact C12 and coil of relay M to positive power. Solenoid S will now be energized thru a circuit from negative power thru armature m1 of relay M, wire 94, contact C13, wire 126, armature s5 and coil of solenoid S to positive power. Solenoid S will therefore operate and cause the cam shaft to move into position 3.

With the system set to operate normally as a reverting or E—W arterial system switch 69 would be closed so that if no actuation of an E—W vehicle detector takes place the cam shaft, after remaining in position 2 for a predetermined time, will be moved into position 3 by action of the periodic call circuit as was previously mentioned. The movement of the cam shaft to position 3 by means of the periodic call circuit is accomplished as follows.

With switch 69 closed condenser KC is charging while the cam shaft is in positions 1 or 2 thru the circuit starting from positive power thru switch 69, contact C37, resistance R8, wires 67, 70, 103, condenser KC to negative power. Condenser KC is connected to grid ct2 of tube CT thru wires 103, 102 and 104. Therefore when condenser KC has been charged to a predetermined voltage the plate current of tube CT will reach a magnitude sufficient to operate relay C thru its circuit starting at positive power thru the coil of relay C and wire 105, plate ct3, and filament ct1 of tube CT, wire 112, potentiometer resistance P1 to negative power. The operation of relay C will complete the circuit from negative power thru armature c1 of relay C, wire 125, 66, contact C29, wire 65, coil of relay F, thence to positive power. Relay F will now operate and cause relay M to operate solenoid S as before explained to move the cam shaft into position 3.

By adjusting the variable resistance R8 the time required to charge condenser KC up to a voltage sufficient to cause the operation of relay C as above described can be made greater or less. Since condenser KC starts to charge when the cam shaft moves into position 1 and E—W periodic call can be made to cause the cam shaft to move from position 2 to 3 at any predetermined time after the N—S lane is given the go signal unless E—W traffic has previously caused said transition. Resistance R3 in a similar manner regulates the timing of the N—S periodic call when the cam shaft is in position 6. It is by closing switches 68 and 69 and properly adjusting variable resistances R3 and R8 that the right of way as before mentioned can be made to normally revert at any desired intervals from street to street in the absence of traffic.

As the cam shaft moves into position 3 contact C12 opens thus breaking the lock-in circuit for relay M which thereupon assumes its unoperated condition.

The operation of the solenoid S to move the cam shaft from position 2 to 3 is as follows. When the solenoid S is energized, as explained above, the core moves into the solenoid. The first effect of this movement is to change each of the solenoid contacts S1—S5 from its rest position in which some contacts are made and others open to the opposite condition wherein those contacts which were made when the solenoid was at rest are broken and those which were broken are made. As contact S5 opens the solenoid is deenergized but the inertia of the solenoid armature carries it beyond this point a considerable distance. At the top of the stroke a pawl engages the cam shaft ratchet so that on the down stroke the cam shaft is revolved thru 45 degrees. On the down stroke some cam contacts change before the solenoid contacts return to their normal positions and others change after in order to secure the proper sequence in the circuit changes occurring during this period of transition from one cam shaft position to another.

While the solenoid is operating to move the cam shaft from position 2 to 3 solenoid contact S3 completes a discharge circuit for condenser KC, which has been timing the periodic call period, to insure that no residual charge remains therein when condenser KC starts to time the maximum period in cam shaft position 3. As the solenoid returns to its unoperated position contact S3 opens this discharge circuit which may be traced from negative power thru contact S3, wire 10, contact C7, wires 102, 103 to condenser KC thence back to negative power again.

While the cam shaft is moving into position 3 and while it remains there the circuits thru which relay A and coil b3 of relay B are energized, which have been previously described, remain as they were when the cam shaft was in position 2. As the cam shaft moves into position 3 relay B will have been operated if more than a predetermined period of time has passed since the last actuation of detector 51 and if relay B remains operated when the cam shaft has reached position 3 it will be effective to move the cam shaft on into position 4. However, as before mentioned, coil b2 of relay B affects the operation of relay B in cam shaft position 3. This effect will now be considered in detail.

The magneto motive force of coil b2, as has been explained before, opposes that of coil b3. Hence the current which begins to flow thru coil b2 as the cam shaft moves into position 3 may, if the current thru coil b3 has at that time reached a magnitude only slightly greater than that required to operate relay B without the opposition of coil b2, be sufficient to cause the armature of relay B to temporarily drop out. However the current thru coil b3 continues to increase if there are no N—S detector actuations. When this last named current reaches a sufficient magnitude it will overcome the opposition of coil b2 and cause relay B to again operate and move the cam shaft on into position 4.

It is thru the effect of coil b2 on the operation of relay B that waiting E—W cross traffic decreases the N—S vehicle interval substantially in accordance with its volume. This is accomplished as follows:

The magnitude of the current thru coil b2 when the cam shaft is in position 3 is regulated in accordance with the number of actuations of detector 52 since the last display of the go signal in the E—W lane, which is substantially a measure of the traffic waiting in the E—W lane. This condition is brought about by connecting the grid bt2 of tube BT to condenser KD in cam shaft position 3. As will later be explained in detail the charge on condenser KD at any time when the cam shaft is in position 8, 1, 2, 3 or 4 is a predetermined charge, introduced when the cam shaft last moved from position 7 to 8, less the several increments removed thereafter in positions 8, 1, 2, 3 and 4 by small condenser K2 in response to vehicle actuations of E—W detector 52. Hence the voltage of condenser KD and therefore the voltage of grid bt2 and consequently the plate current of tube BT, i. e., the current flowing thru coil b2 of relay B, will be of a magnitude less than a predetermined value by an amount substantially in proportion to the number of actuations of detector 52 since the "go" signal was last displayed in the E—W lane. As will be later explained in connection with the description of the circuits for reducing the voltage of condenser KD by increments by condenser K2 the amount of this reduction will be independent of the speed of invidual E—W vehicles but will depend only upon the number of actuations by such vehicles.

Since a reduction of the current in coil b2 facilitates correspondingly the operation of relay B by the current in coil b3 a smaller current in coil b3 will be sufficient to operate relay B. A correspondingly smaller charge in condenser KE, which controls the current thru coil b3, will be sufficient to produce this smaller current in coil b3. Since this smaller charge will accumulate in condenser KE in a proportionately shorter period than would be required for a greater charge the vehicle interval being timed by this relay will, because of the sequential effects described, be decreased in accordance with the reduction of the current in coil b2. Since the reduction of the current in coil b2 is, as above stated, in accordance with the volume of waiting E—W cross traffic the reduction of the N—S vehicle interval will consequently also be in accordance with the volume of waiting E—W cross traffic.

The proportion of the plate current of tube BT passing thru coil b2 of relay B with the cam shaft in position 3 is regulated by adjusting resistance R11 in order, as before mentioned, to increase or decrease the effectiveness of waiting E—W vehicles to reduce the N—S vehicle interval. The circuit including resistance R11, wire 87, contact C26, and wire 89 accomplishes this effect by bypassing around coil b2 of relay B a proportion of the plate current of tube BT determined by the value of resistance R11.

The circuit for the charging of condenser KD during the movement of the cam shaft from position 7 to 8 as mentioned above will be traced when the transition of the cam shaft from position 7 to 8 is described. The circuit by which this charge is diminished by vehicle actuation of E—W detector 52 occurring while the cam shaft is in positions 8, 1, 2, 3 or 4 is traced as follows:

When relay F is unoperated condenser K2 is charged from condenser KD thru the circuit starting from negative power thru potentiometer resistance P3, wire 76, condenser K2, wire 74, armature f1 of relay F, wire 72, contact C25, wire 86, 91, condenser KD thence back to negative power. An actuation of detector 52 will, as before explained, operate relay F which will break the last described circuit at armature f1 of relay F thus disconnecting condenser K2 from condenser KD. Furthermore the operation of relay F will establish a discharge circuit for condenser K2 as follows, condenser K2, wire 74, armature f2 of relay F, wire 78, potentiometer resistance P3, and wire 76. As the vehicle releases detector 52, relay F becomes de-energized thereby breaking the discharge circuit for condenser K2 and reconnecting condenser K2 with condenser KD from which it will again be charged thereby removing another increment of charge from condenser KD. As indicated before, condenser K2 is of considerably smaller capacity than condenser KD and therefore each actuation of relay F by an E—W vehicle reduces the charge and corresponding voltage of condenser KD by only a small increment. Also such reduction of charge on condenser KD by a series of E—W actuations is arranged to take place on a relatively straight portion of the natural discharge—time curve of the condenser KD. Thus successive actuations reduce the charge on condenser KD by substantially the same amount and the total amount of reduction by a series of actuations is substantially proportionate to the number of actuations in such series. It will be appreciated that small condenser K2 will be substantially fully charged each time it is connected to large condenser KD by actuation of relay F, and then condenser K2 will be substantially discharged upon de-energization of relay F by cessation of such actuation and therefore the amount of charge removed from condenser KD by each such actuation will be independent of the time relay F is energized by such actuation and consequently will be independent of the speed of individual actuating vehicles.

The magneto-motive force of coil *b2* which as before explained opposes that of coil *b3* is always considerably less in magnitude than that of coil *b3* since it is intended merely to serve to fix the current required in coil *b3* to operate relay B. The more vehicles waiting in the E—W lane the less will be the current in coil *b2* when the cam shaft is in position 3 as previously explained, hence a correspondingly lower current is coil *b3* will operate relay B. Since the charge in condenser KE which controls the current thru coil *b3* in cam shaft position 3 will be built up more quickly to the lower value required to produce this lower current in coil *b3*, the vehicle interval being timed thereby is therefore decreased substantially in proportion to the number of vehicles waiting in the E—W lane.

The circuit by which condenser KD is connected to grid *bt2* is from negative power to condenser KD, wire 91, 93, contact C23, wires 120 and 121. Contact C19 thru which grid *bt2* is usually biased negative is open when the cam shaft is in position 3.

The circuit by which relay B operates the solenoid S to move the cam shaft to position 4 is from negative power thru contact C31, wire 123, armature *b1* of relay B, wire 126, armature *s5* and coil of solenoid S to positive power.

While the cam shaft is in position 3 condenser KE is, as previously mentioned, subject to discharge by actuation of N—S detector 51 in order that each vehicle entering the intersection from the N—S lane may initiate a new vehicle interval to permit its passage thru the intersection. If vehicles in the N—S lane approach at sufficiently short intervals they may by repeatedly discharging condenser KE keep its voltage so low that tube AT will not at any time pass current enough to operate relay B. In order to insure that a continuous line of traffic in the N—S lane cannot thus indefinitely hold the right of way another means for moving the cam shaft into position 4 is provided in the maximum timer, the operation of which is not affected by traffic.

The maximum timer as before mentioned is comprised of relay C, tube CT, condenser KC and resistance R2. Relay C when operated in cam position 3 is affected to move the cam shaft into position 4 thru the following circuit, negative power, armature *c1* of relay C, wire 125, contact C30, wires 124, 126, contact *s5* and coil of solenoid S to positive power. Condenser KC is connected to grid *ct2* of tube CT by wires 103, 102 and 104, and is charged in cam position 3 thru a circuit from positive power, contact C34, resistance R2 and wire 70. Resistance R2 is adjusted to charge condenser KC at the proper rate to operate relay C a predetermined time after the cam shaft has moved into position 3 hence this timer circuit will be effective as a maximum timer to move the cam shaft into position 4 at the end of this predetermined period if continuous N—S traffic has prevented relay B from doing so earlier.

If relay A is unoperated as the cam shaft moves from position 3 to 4 it will put in a N—S return call by causing operation of relay E, just as if a vehicle were to actuate detector 51 at that instant. The circuit by which relay A determines operation of relay E is from negative power to armature *a1* and back contact of relay A, wire 106, contact *s2* of solenoid S, wire 63, contact C6, wire 61 to coil of relay E thence to positive power. Contact C6 is closed only in cam position 3 and contact S2 is closed only while the solenoid is in its operated position, hence this circuit is completed if relay A is unoperated while the solenoid is in its operated position preparatory to moving the cam shaft into position 4 which it will do as it returns to its unoperated position.

Relay A will be unoperated and will therefore thru the above circuit put in a N—S return call as the cam moves into position 4 if as before stated the vehicle interval then prevailing has by waiting E—W traffic or otherwise been decreased to less than a predetermined time, or if the last N—S vehicle interval was initiated less than a predetermined time before the said cam shaft transition to position 4 took place. In the above description of the two conditions under which a return call will be put in, the predetermined time mentioned is fixed by the operating period of relay A. This can be seen to be true because of the following facts.

In cam shaft position 3 the operation of relay B, which times the vehicle interval, or of relay C, the maximum timer, will be effective to move the cam shaft on into position 4 and thus extinguish the N—S go signal and illuminate the N—S amber or warning signal. If relay A operates before either relay B or relay C operates no N—S return call will be put in since contact *a1* will be broken when the solenoid operates but if relay A does not operate before the cam shaft is moved into position 4 by action of either relay B or relay C a N—S return call will be put in during this transition. Whether relay A operates before or after relay B or relay C depends upon circumstances involving the following factors.

Relay A always operates when the current thru its coil reaches a predetermined value which, in cam position 3, always occurs a predetermined time after the last vehicle actuation of a N—S detector. Relay B always operates when the difference between the current in coils *b2* and *b3* reaches a predetermined magnitude which condition occurs at a time after the last vehicle actuation of a N—S detector dependent upon the current in coil *b2*. Hence, although the same current passes thru relay A and thru coil *b3* of relay B, relay B may operate either before or after relay A dependent upon the effect of the current flowing thru coil *b2* on the operation of relay B. If the operating period of relay B by action of waiting cross traffic on the current thru coil *b2* is decreased to less than that of relay A, the return call will be put in. But if the operating period of relay B is not so decreased and is consequently longer than that of relay A no return call will be put in if the cam shaft movement is caused by relay B. Hence the operating period of relay A constitutes the predetermined period below which the vehicle interval must be reduced by waiting cross traffic in order to put in a return call. If on the other hand the cam shaft is moved into position 4 by action of the maximum timer relay C less than a predetermined time after the last detector actuation in the N—S lane, that is, before relay A has operated, a N—S return call will be put in.

While the solenoid is operated in moving the cam shaft into position 4 condenser KE, preparatory to timing the next N—S initial interval and preparatory to decreasing the E—W vehicle intervals in accordance with the waiting N—S cross traffic, is charged to a predetermined voltage thru a circuit starting at negative power thence to condenser KE, wires 90, 92, contact C4, wire 107, contact s1 of solenoid S, wire 109, contact C1, wire 111, potentiometer resistance P1 to positive power. The voltage to which condenser KE is charged by this circuit can be regulated thru setting the point at which wire 111 makes contact with potentiometer P1.

While the cam shaft is in position 4, 5, 6, 7 or 8 the charge put into condenser KE as the cam shaft moved into position 4 is subject to diminution at each vehicle actuation of N—S detector 51 by the amount required to charge condenser K1 which is discharged and recharged from condenser KE once for each such actuation. When the cam shaft next reaches position 1, the N—S initial interval position, the recharging period of condenser KE will time that interval thus causing it to be timed substantially in accordance with the number of vehicles waiting at that time in the N—S lane.

The circuit by which condenser K1 diminishes the charge in condenser KE in response to N—S detector actuations is as follows. At each actuation of detector 51 relay E operates as previously explained. While relay E is operated condenser K1 is discharged to a predetermined voltage thru wire 75, condenser K1, wire 73, contact e2 of relay E and wire 77. The charge left in condenser K1 by this circuit is adjustable by setting the points at which wires 75 and 77 make contact with potentiometer resistance P2. Each time relay E returns to its unoperated condition contact e2 breaks after which contact e1 makes thus reconnecting condenser K1 to condenser KE from which it will recharge thru wire 75, condenser K1, wire 73, contact e1, wire 71, contact C14, wires 85, 90, condenser KE thence back to negative power.

During the transition of the cam shaft from position 3 to 4 condenser KC is again discharged thru the circuit previously traced thru contact C7 and solenoid contact s3 preparatory to its use in timing the N—S amber period during which period the cam shaft is in position 4. In this cam shaft position the N—S go signal circuit is opened by contact C38 and the N—S amber or warning signal circuit is completed by contact C40.

While the cam shaft is in position 4, the N—S amber position, relays A and B can not operate to move it into position 5 since the grids of tubes AT and BT are biased sufficiently negative thru contacts C20 and C19 respectively to prevent any plate current from flowing in these tubes which control the operation of relays A and B.

The timing of the N—S amber period, during which the cam shaft is in position 4, is regulated by the charging period of condenser KC which during this period is charging thru a circuit starting from negative power to condenser KC, wires 103, 70, resistance R1 and contact C32 to positive power. The duration of the N—S amber period can be adjusted by varying resistance R1. When condenser KC is charged to a predetermined voltage tube CT will cause relay C to operate which will in turn thru a circuit previously described energize solenoid S to move the cam shaft into its next position, in this case position 5, the E—W initial interval position.

While the solenoid S is operated to move the cam shaft into position 5 the discharge circuit for condenser KC is again completed thru contact C7 and contact S3 in order to prepare this condenser for timing the next N—S periodic call period which it will time while the cam shaft is in positions 5 and 6, if switch 68 is closed as will be the case if the system is operating normally as a reverting system or an arterial system with the N—S lane the artery. The charging circuit for condenser KC in cam shaft positions 5 and 6 includes switch 68, contact C36, resistance R3, wires 70 and 103. The charging period for condenser KC in cam shaft positions 5 and 6 can be regulated by varying resistance R3. When this condenser is charged to a predetermined voltage tube CT will operate relay C which will operate relay E thru contact C28 to call the right of way to the N—S lane.

In cam shaft position 5 contacts C39 and C40 open the circuit to the E—W stop signal 50 and the N—S amber or warning signal 46 respectively. Contacts C41 and C42 close to complete the circuits to the E—W go signal 48 and the N—S stop signal 47 respectively. Contact C20 is open which disconnects grid at2 of tube AT from negative power and contact C24 is closed to connect grid at2 with condenser KD. Contact C21 is closed in this cam position to complete a charging circuit for condenser KD, thru resistance R10, contact C21 and wires 86, 91. Thru this circuit condenser KD will be recharged from the voltage to which it had been lowered by vehicle actuations of the E—W detector while the cam shaft was in positions 8, 1, 2, 3 and 4. This recharge period will be substantially in accordance with the number of such actuations thereby timing the E—W initial interval in substantial accordance with the number of vehicles waiting in the E—W lane at the beginning of this interval.

When condenser KD is so recharged to a predetermined voltage tube AT will pass a plate current thru coil b3 of relay B sufficient to operate relay B to move the cam shaft into position 6. The operation of relay B is not in this case affected by coil b2 because the grid of tube BT is, as previously stated, biased negative thru contact C19 to prevent the passage of any plate current in tube BT. Because of the small current required in coil b3 to operate relay B in the absence of opposition from coil b2, relay A does not operate. Moreover, if relay A did operate it would have no effect since in cam shaft positions 5 and 6 its connection to relay E and F is broken by contacts C6 and C5 respectively.

As the cam shaft is by action of relay B moved into position 6, condenser KD is discharged to prepare it for timing the E—W vehicle interval when the cam shaft is in positions 6 or 7. This discharge circuit starts at negative power thence to condenser KD then thru wires 91, 93, contact C3, wire 108, contact S1, wire 110, contact C2, back to negative power.

Position 6 is the E—W rest position just as position 2 is the N—S rest position. Movement of the cam shaft from position 6 to 7 is accomplished, like the movement from position 2 to 3, only thru the operation of relay M. Relay M will have been locked in its operated position if a vehicle has actuated the N—S detector 51 since the go signal in the N—S lane was last extinguished or, as previously explained in describing the operation of the apparatus when the cam shaft was in position 3, if either of the following conditions prevailed when the cam shaft last moved from position 3 to 4:

1. If the right of way was last withdrawn from the N—S lane by action of the maximum timer relay C less than a predetermined time after the last actuation of a N—S detector, or 2. If at the time of this transfer the N—S vehicle interval had been decreased by waiting E—W traffic to less than a predetermined minimum period.

If relay M has been locked as a result of the existence of any of the foregoing conditions it will be effective as soon as the cam shaft reaches position 6 to operate the solenoid to move the cam shaft on into position 7 thru the circuit which included armature *m1* and contact C13 previously described in connection with the movement of the cam shaft from position 2 to 3.

If relay M has not been operated when the cam shaft moves into position 6 this last named circuit will be open at armature *m1* and solenoid S will not be energized until relay M is subsequently operated by action of relay E which can be operated either from an actuation of N—S detector 51 or from the action of the periodic call relay C to cause a normal reversion, the circuit for which has been previously described. Condenser KC which cooperates to time the periodic call is, with the cam shaft in position 5 or 6, charged thru the circuit including switch 68, contact C36 and resistance R3. The timing of this N—S periodic call, as before mentioned, can be adjusted by varying resistance R3.

As the cam shaft moves from position 6 to 7 condenser KC is discharged thru the circuit including contact C7 and armature *s3* of solenoid S to prepare it for timing the maximum period in cam shaft position 7. The circuit of condenser KC, tube CT and relay C to time this maximum period is identical with that described in connection with the operation of the apparatus when the cam shaft is in position 3 except that the charging circuit for condenser KC includes resistance R7 and contact C35 instead of R2 and C34.

The E—W vehicle interval is timed in position 7 as the N—S vehicle interval was in position 3 except that the grid of tube AT is connected to condenser KD thru contact C24 instead of to condenser KE which makes the operation of the E—W detector 52 instead of the N—S detector 51 effective to initiate a new vehicle interval. Furthermore the counteracting effect of coil *b2* of relay B is controlled by the voltage of condenser KE thru contact C17 instead of by condenser KD, hence the waiting N—S traffic is effective to decrease the vehicle interval in cam shaft position 7 just as waiting E—W traffic decreased the vehicle interval in cam shaft position 3.

In cam position 7 resistance R12 thru contact C27 regulates the proportion of the plate current from tube BT flowing thru coil *b2* whereby the magnitude of the effect of each N—S vehicle actuation to decrease the E—W vehicle interval can be controlled.

As the cam shaft moves into position 8 by action of either relay B or relay C a return call to the E—W lane will be put in if relay A is unoperated just as such a call was put in for the N—S lane when the cam shaft left position 3 if relay A was then unoperated. The circumstances under which relay A will be unoperated when the cam shaft moves from position 7 to 8 are identical with those which would cause it to be unoperated as the cam shaft moves from position 3 to 4 except that these circumstances pertain to conditions caused by E—W traffic instead of N—S traffic.

During the transition of the cam shaft from position 7 to 8 condenser KD is charged to a predetermined voltage which as before stated will in cam shaft positions 8, 1, 2, 3 and 4 be diminished by vehicle actuation of E—W detector 52 to prepare this condenser for decreasing the N—S vehicle interval when the cam shaft reaches position 3 and for timing the next E—W initial interval when the cam shaft reaches position 5. The circuit thru which condenser KD is charged as mentioned during the transition position 7 to 8 is thru wires 91, 93, contact C3, wire 108, armature S1, wire 109, contact C1, wire 111 to potentiometer resistance P1. The voltage of this charge is regulated by the point at which wire 111 makes contact with P1. The condenser KC is also during this transition discharged thru the circuit including contact C7 and armature S3 in preparation for its use in timing the E—W amber period in cam shaft position 8.

In cam shaft position 8, the E—W amber signal position, E—W go signal 48 is extinguished thru the opening of contact C41 and the E—W amber or warning signal 49 is illuminated by the closing of contact C43.

Condenser KC, tube CT and relay C co-operate to time the E—W amber period as they do to time the N—S amber period which has been previously explained in detail. However, the charging circuit for condenser KC in cam shaft position 8 includes resistance R6 and contact C33 instead of R1 and contact C32 which are a part of the corresponding circuit in cam shaft position 4. The duration of the E—W amber period can be regulated by adjusting resistance R6.

As the cam shaft moves from position 8 to 1, condenser KC is again discharged thru the circuit including contact C7 and armature S3 to prepare it for timing the E—W periodic call which it will do in cam positions 1 and 2 if switch 69 is closed as previously explained.

The N—S initial interval, cam shaft position 1 is timed substantially in accordance with the number of waiting vehicles in the N—S lane by condenser KE cooperating with tube AT and relay B exactly as the E—W intial interval was timed by the same tube and relay cooperating with condenser KD. Condenser KE, it will be remembered, was charged to a predetermined voltage as the cam shaft moved from position 3 to 4 which charge has in cam shaft positions 4, 5, 6, 7 and 8 been diminished substantially in accordance with the numbr of vehicles actuating the N—S detector 51. Hence, as previously explained, the duration of the N—S initial interval which is governed by the time required to recharge condenser KE will be substantially in accordance with the number of vehicles waiting in the N—S lane at the beginning of this interval.

As the cam shaft moves into position 1 the E—W amber signal 49 is extinguished by the opening of contact C43, and the N—S stop signal 49 is extinguished by the opening of contact C42. The N—S go signal 45 is illuminated by the closing of contact C38, and the E—W stop signal 50 is illuminated by the closure of contact C39.

As the cam shaft moves from position 1 to 2 condenser KE is discharged thru the circuit including contact C4, armature *s1* and contact C2 to prepare it for timing the N—S vehicle interval in cam positions 2 and 3.

The movement of the cam shaft into position 2 completes the signal cycle.

Stated briefly, intervals are timed by this first embodiment of my invention by charging or discharging condensers KC, KD and KE. Condenser KC times those intervals which are unaffected by traffic and do not vary from cycle to cycle.

The charge in condenser KD is influenced by E—W traffic actuations and is instrumental in timing the signal display periods in accordance with the requirements of E—W traffic. The charge in condenser KE is similarly influenced by N—S traffic actuations and is instrumental in timing the signal display periods in accordance with the requirements of N—S traffic.

During the N—S initial interval, cam shaft in position 1, condenser KE, which has since the last N—S traffic timed period been subject to the removal of unit charges by each N—S traffic actuation, is now subject to regular charging action, not reset by actuation, to time the initial interval by recharging from that point to which it has been discharged by such removal of unit charges.

During the E—W initial interval, cam shaft in position 5, condenser KD functions similarly to time this interval.

During the N—S traffic timed period of right of way, cam shaft position 3, condenser KE is subject to regular charging action to time this period and is subject to reset discharge by each N—S traffic actuation to extend this period by one vehicle interval. At the same time condenser KD, which is and has been since the last E—W traffic timed period subject to the removal of unit charges by each E—W traffic actuation, serves to govern the length of such N—S vehicle interval.

During the E—W traffic timed period, cam shaft in position 7, condensers KD and KE perform similarly except that their functions are interchanged.

Another and in some respects a preferred embodiment of this invention is shown in Figs. 5 and 6. This second embodiment employs a rotary line switch instead of a cam shaft, and grid controlled discharge tubes instead of the amplifier type three element thermionic tubes. The use of the grid controlled discharge tubes makes it unnecessary to employ a double coil relay to permit waiting cross traffic to decrease the vehicle interval as will subsequently be explained. Furthermore because of the sharply defined "breakdown" voltage of this type of tube great accuracy is possible in timing the various intervals. Moreover since their grid potential determines their "breakdown" voltage the circuits involving these tubes can be adjusted to compensate for variations in tube characteristics by connecting the grid to an appropriate potentiometer tap when tubes are replaced. Thus the accuracy of the timing of the various intervals can be maintained independent of variation of tube characteristics in different replacement tubes.

The stepping switch shown in Fig. 5 has eight positions just as did the cam shaft of Figs. 3 and 4. A stepping switch of more than eight positions can be used as an eight position switch if desired by providing rapid stepping thru the extra positions in accordance with well known methods.

The various time intervals correspond substantially in both embodiments. In this second embodiment as in the first the initial interval is timed substantially in accordance with the number of waiting vehicles by charging a condenser during that interval from an initial voltage predetermined by the amount of said waiting traffic.

When the stepping switch is in its traffic timed positions 3 or 7, three timers run concurrently. One of these, the maximum timer, is not subject to vehicle control. The other two, the variable vehicle interval timer and the normal vehicle interval timer, are both subject to reset thru plate condenser discharge by traffic actuations in the lane in which the go signal is being displayed. Hence their periods start simultaneously after each such reset. The variable vehicle interval timer is subject also to partial control by waiting cross traffic which decreases its operating period. The normal vehicle interval timer on the other hand is not affected by cross traffic.

The variable vehicle interval timer period is decreased by waiting cross traffic thru having the grid potential of the tube timing this period rendered less negative by waiting cross traffic thus causing said tube to become conducting at a lower plate voltage which correspondingly decreases the period required for charging the plate condenser to this lower voltage and so decreases correspondingly the variable vehicle interval. Hence the larger the amount of waiting cross traffic the shorter the variable vehicle interval will be. From the above description it can be seen that the variable vehicle interval timer in effect balances the increasing pressure to take the right of way exerted by accumulating waiting traffic on one street against the right of way retaining effect exerted by moving traffic on the other street. The latter effect may be termed the "holding power" and is proportionate to the frequency with which said moving traffic resets the variable vehicle interval timer, since moving traffic having the right of way will reset this timer at a higher time frequency as the time spacing between actuated vehicles is reduced in the moving stream of traffic, or in other words as the vehicles become more closely spaced. The closer the spacing of vehicles is in the stream of traffic moving with the right of way the shorter is the time interval between vehicles in which condenser KVV is allowed to charge, and the lower is the maximum voltage condenser KVV is allowed to reach, so that such traffic tends to hold the condenser voltage below the "break down" of tube VVT and thus to "hold" the right of way. This "holding power" is opposed by the action of traffic approaching at a distance on the opposite street, which does not have the right of way and on which approaching traffic stops as it reaches the intersection. Each actuation by vehicles of the latter traffic reduces the negative grid bias on tube VVT and thus reduces its "break down" voltage, so that condenser KVV voltage does not have to rise so high to operate tube VVT and cause release of right of way.

If the variable vehicle interval is decreased to less than the normal vehicle interval right of way will be yielded by action of the variable vehicle interval timer when traffic ceases to approach the intersection from the lane in which the go signal is being displayed. The variable vehicle interval timer is arranged to automatically put in a return right of way call whenever it operates to yield right of way. If there is little waiting cross traffic and consequently the variable vehicle interval is not reduced to less than the normal vehicle interval, the normal vehicle interval timer will operate first to yield the right of way. The operation of this timer does not put in a return right of way call. Hence in the second embodiment of my invention as in the first, a right of way recall will be automatically put in if the vehicle interval at the time of right of way transfer has been reduced by waiting cross traffic to less than a predetermined period. In this second embodiment shown in Figs. 5 and 6 the "predetermined period" referred to is the normal vehicle interval timer period whereas in the first embodiment shown in Figs. 3 and 4 the corresponding "predetermined period" is the normal period for charging the timing condenser to the voltage necessary to operate period of relay A. This charging period will be greater than that for operation of relay B in the presence of any considerable amount of waiting cross traffic.

If repeated traffic actuations in the lane in which the go signal is being displayed continually reset both of the vehicle interval timers thus preventing either of them from operating the right of way will be transferred by action of the maximum timer, which is effective in the traffic timed stepping switch positions 3 or 7. A return call for the right of way is automatically put in by this timer whenever it operates.

The fact that the maximum timer operates and the normal vehicle interval timer does not operate indicates that the normal vehicle interval timer was reset by a traffic actuation less than the time period of said normal vehicle interval timer, i. e., less than a "predetermined time" before the transfer of the right of way. It will be remembered that this is one of the conditions under which the embodiment of Figs. 3 and 4 also is arranged to automatically put in a return right of way call, the "predetermined time" in that apparatus being the time period of relay A. Hence both embodiments fulfill this condition.

The stepping switch, like the cam shaft of the first embodiment, will remain in either of its two rest positions 2 or 6 unless the system is set for normally arterial or reverting operation or unless a cross traffic call is put in by a cross lane detector actuation.

Referring to Figs. 5 and 6 the following points will be noted. Those elements in Figs. 5 and 6 which correspond closely with specific parts shown in Figs. 3 and 4 are designated in Figs. 5 and 6 by the same number or letter used in Figs. 3 or 4 with the letter Z added, as for example the signals in Fig. 3 are numbered 45 to 50 inclusive and in Fig. 5 are designated as Z45 to Z50 inclusive.

The stepping switch contact banks, designated as SB1 to SB6 inclusive, are shown in Figs. 5 and 6 to the right of the grounded power wire which extends from the bottom to the top of both figures just to the left of the center. The stepping switch driving magnet, designated as DM, is shown in the lower left corner of Fig. 6. This magnet DM drives the wipers W1 to W6 in unison over the banks SB1 to SB6 respectively. Beside it is a rectifier used to supply D. C. for the driving magnet coil.

The signals shown at the top of Fig. 5 are controlled by relays ALR and BLR. The apparatus to the left of the grounded power wire in Fig. 5 is in general effective to co-operate with the apparatus of Fig. 6 to call and hold the right of way on the N—S lane whereas that to the right of the grounded power wire similarly co-operates with the apparatus of Fig. 6 to call and hold the right of way on the E—W lane.

Relay AM is energized thru contacts in stepping switch bank SB2 when the stepping switch is in positions 2 and 3, the N—S rest position and the N—S traffic timed positions respectively. Right of way can be called to the N—S lane by the de-energization of relay AM which can occur in response to a N—S traffic actuation when the right of way is not on the N—S lane. Furthermore if the right of way leaves the N—S lane thru action of the maximum timer relay MXR or the variable vehicle interval timer relay VVR the relay AM will be de-energized thus putting in a call for the return of the right of way to the lane from it is being withdrawn, in this instance the N—S lane. It will be remembered that the placing of a return call has been mentioned as a function of both the maximum timer and the variable vehicle interval timer.

If on the other hand the right of way is transferred from the N—S lane by action of the normal vehicle interval timer relay YR, relay AM will not be de-energized but will remain locked in thru subsequent stepping switch positions unless it is de-energized by the actuation of a N—S vehicle detector in order to call the right of way to the N—S lane.

Relay BM performs similarly with respect to the E—W lane, being operated thru contacts of stepping switch bank SB1 when the stepping switch is in position 6 or 7, the E—W rest and traffic timed positions respectively. It is de-energized to put in an E—W return call as the right of way is withdrawn from the E—W lane if said withdrawal is caused by the maximum timer relay MXR or the variable vehicle interval timer relay VVR but remains locked in if said withdrawal of the right of way is caused by the operation of the normal vehicle interval timer relay YR. Relay BM in subsequent stepping switch positions can be de-energized by action of relay FZ in response to an actuation of E—W detector Z52 in order to call the right of way to the E—W lane.

Relay AR which is energized by stepping switch contacts of bank SB1 in stepping switch positions 1, 2, 3 and 4, the N—S right of way and amber positions, energizes signal relay ALR and completes certain of the timing condenser circuits as will later be explained in detail.

Relay BR is energized in stepping switch positions 4, 5, 6 and 7 to similarly energize signal relay BLR and connect other timing condenser circuits.

The maximum timer, effective in the N—S and E—W traffic timed stepping switch positions 3 and 7 to limit the time during which moving traffic can hold the right of way against waiting cross traffic, includes relay MXR, plate condenser KMX and tube MXT.

The variable vehicle interval timer includes relay VVR, tube VVT, plate condenser KVV and grid condensers KGNS and KGEW. It times the variable vehicle intervals in stepping switch positions 3 and 7, the charge in condensers KGNS and KGEW being affected respectively by E—W and N—S traffic so as to decrease the variable vehicle interval in the N—S and E—W lanes respectively in accordance with the amount of waiting cross traffic as previously mentioned.

Relay YR, tube YT and condenser KV cooperate to time the normal vehicle interval, with the stepping switch in position 3 or 7, which interval starts simultaneously with the variable vehicle interval after each vehicle actuation in the lane having the "go" signal. The timing of the normal vehicle interval it will be remembered is not affected by waiting cross traffic whereas the timing of the variable vehicle interval is affected by waiting cross traffic.

Relay YR and tube YT cooperate with other condensers in different stepping switch positions to time other intervals as follows. The N—S initial interval, stepping switch position 1, is timed by relay YR, tube YT and condenser KINS, the charge in condenser KINS at the beginning of this interval having been predetermined by N—S vehicle actuations occurring during or before the preceding display of the N—S stop signal in order to time the N—S initial interval in accordance with the amount of N—S traffic waiting at the beginning of the N—S go signal display period.

Relay YR and tube YT cooperate similarly with condenser KIEW to time the E—W initial interval, stepping switch in position 5, in accordance with the amount of E—W traffic waiting at the beginning of the E—W "go" signal display period, the starting charge in condenser KIEW being predetermined in accordance with the amount of said waiting E—W traffic.

The same relay and tube cooperate with condenser KY to time a minimum period during which the stepping switch remains in its rest positions 2 and 6 in order to ensure that when the "go" signal is given to a lane it will remain there for a reasonable minimum period. At the expiration of said minimum period the right of way will be transferred to the other lane only if traffic or normal reversion requires it, hence the name "rest position". This same group times the N—S and E—W amber or warning periods, stepping switch in positions 4 and 8 respectively.

To more completely describe the features of the embodiment of my invention shown in Figs. 5 and 6 I shall now explain its operation thru a complete signal and stepping switch cycle beginning in the N—S initial interval when the right of way has just been given to the N—S lane, stepping switch in position 1.

In this stepping switch position relay AR is operated, current being supplied thru the circuit starting at grounded power thence thru position 1 of stepping switch bank SB1 to relay AR to A. C. plus power. Relay AR when operated causes signal relay ALR to be energized thru the circuit starting at A. C. plus, thru relay ALR, wire 202 to contact *ar1* of relay AR thence to grounded power. Relay BR is de-energized in stepping switch position 1, its circuit being open at stepping switch bank SB2. Hence signal relay BLR is de-energized since its operating circuit includes contact *br1* of relay BR.

Wipers W1 and W2 are of the bridging type so that the relays energized thru them at their respective contact banks SB1 and SB2 will not be de-energized as the stepping switch moves from one position to the next.

With relay ALR operated and relay BLR unoperated the N—S go signal Z45 will be illuminated thru the circuit beginning at grounded power, thru signal Z45 thence to contact *blr1* of relay BLR thence to connect *alr4* of relay ALR and to A. C. plus power. The E—W stop signal Z50 is illuminated thru the circuit from grounded power to A. C. plus power including signal Z50 and contact *alr2* of relay ALR. The circuits to the other four signals are incomplete in stepping switch position 1.

Explanation of the relay AM coil circuit will be helpful at this point as an aid in following this step by step description of the system operation.

Relay AM has an operating circuit from grounded power thru wiper W2, stepping switch bank SB2 positions 2 and 3, wire 206, 205, coil of relay AM, wires 204, 276, 277, 227, contact *dm2* to A. C. plus. It has in addition a holding circuit from grounded power thru contact *ez1* of relay EZ, contact *am1* of relay AM, wire 205, coil of relay AM, wires 204, 276, 277 to contact *am2* of relay AM, wire 270, contact *mxr1* of maximum timer relay MXR, contact *vvr1* of variable vehicle interval timer relay VVR, thence to A. C. plus power.

In stepping switch position 2 relay AM is energized thru the operating circuit described above. That part of the operating circuit supplying current to the left side of the coil remains complete from the time the stepping switch enters position 2 until it leaves position 3 after which it is broken at bank SB2. Wiper W2 is of the bridging type to insure continuity of the above circuit as the stepping switch moves from position 2 to 3.

That part of the operating circuit energizing the right side of the coil of relay AM will be opened at contact *dm2* as the stepping switch moves from position 2 to 3. However that portion of the holding circuit paralleling the last named part of the operating circuit remains intact to supply relay AM with A. C. plus power while contact *dm2* is open during the stepping switch movement. From the above description it can be seen that relay AM is always energized when the stepping switch is in position 2 or 3 and when it is moving from position 2 to position 3.

The functioning of relay AM in subsequent stepping switch positions will be explained as the circuit operation in each position is considered.

The N—S initial interval is timed by relay YR, tube YT and condenser KINS. During this interval condenser KINS is connected to relay YR and to the plate of tube YT thru the circuit going from grounded power to condenser KINS to wires 282, 290, 284 to stepping switch bank SB3 position 1 to wiper W3, wires 224, 225 to coil of relay YR, wire 260 to plate of tube YT. During the N—S initial interval condenser KINS is charged thru the circuit starting at grounded power, to condenser KINS, wires 282, 290, 284, to stepping switch bank SB3 position 1 to wiper W3, wires 224, 223 to timing resistance RZ5, wire 214, to stepping switch bank SB4 position 1, to wiper W4, wire 226 to stepping switch driving magnet contact *dm1* to D. C. plus power. When condenser KINS is charged to a predetermined voltage the tube YT will "break down", i. e., become conducting, thereby connecting relay YR to ground and allowing condenser KINS to discharge thru relay YR which will therefore operate and thru contact *yr1* connect the rectifier associated with the driving magnet DM to power thus energizing the stepping switch driving magnet DM which will thereupon move the stepping switch into its next position. To vary the duration of the N—S initial interval the rate at which condenser KINS is charged in stepping switch position 1 can be adjusted by regulating the variable charging resistance RZ5.

It has previously been stated that the initial interval is by the apparatus of Figs. 5 and 6 as well as by that of Figs. 3 and 4 timed substantially in accordance with the amount of waiting cross traffic thru having the charge in the initial interval timing condenser at the beginning of the initial interval predetermined by such waiting cross traffic. In this connection consider specifically the N—S initial interval during which the stepping switch is in position 1.

While the stepping switch was last in positions 2 and 3 relay AM was energized as has been previously explained. Therefore in these two stepping switch positions condenser KINS was charged thru the circuit from grounded power to condenser KINS, wires 282, 281, contact *am4* of relay AM, to resistance RZ15, wire 228 to potentiometer resistance PZ7. The maximum voltage to which condenser KINS can be charged by this circuit is predetermined by the point on the potentiometer PZ7 to which wire 228 is attached. The rate at which condenser KINS is so charged can be regulated by the adjustment of variable resistance RZ15.

While condenser KINS was being charged in stepping switch positions 2 and 3 as explained above and during succeeding intervals up to the E—W amber period immediately preceding the next N—S initial interval, i. e., while the stepping switch was in positions 2, 3, 4, 5, 6 and 7, the charge of condenser KINS was subject to the removal of an increment of charge by action of condenser KZ1 at each actuation of N—S detector Z51 just as, in the embodiment shown in Figs. 3 and 4 the charge in condenser KE was removed in increments by action of condenser K1.

The fact that increments of charge are removed from condenser KINS in response to N—S actuations even during the N—S go signal display period provides a means whereby those N—S vehicles which, under heavy traffic conditions, are stopped by loss of right of way after having actuated the N—S detector make their presence effective to increase the next N—S initial interval.

The removal of increments of charge from condenser KINS is accomplished thru the following circuit including contacts of relay EZ. Condenser KINS is connected to contact *ez2* of relay EZ thru contact *am3* of relay AM in stepping switch positions 2 and 3 and thru contact *br2* of relay BR in stepping switch positions 4, 5, 6 and 7. Hence in all of these named stepping switch positions actuations of N—S detector Z51 which operates relay EZ will cause contact *ez2* and *ez3* to cooperate to remove an increment of charge from condenser KINS just as contacts *e1* and *e2* did in the embodiment of my invention shown in Figs. 3 and 4.

The charge so removed from condenser KINS by waiting N—S traffic is replaced thru resistance RZ5 during the initial interval thus timing said initial interval in accordance with the amount of such waiting N—S traffic. When condenser KINS is so recharged, i. e., when the N—S initial interval is over, tube YT becomes conductive and condenser KINS discharges thru relay YR which thereupon operates. The stepping switch, as previously explained, thereupon moves on into position 2, the N—S rest position. During the movement of the stepping switch from position 1 to 2 condenser KY is discharged thru driving magnet contact *dm3* in preparation for its use as a timing condenser in stepping switch position 2.

If the system is not set for normal reversion to the E—W lane and there is no waiting E—W traffic the stepping switch will remain in this N—S rest position and the N—S lane will be continuously accorded the go signal until an E—W traffic actuation shall occur.

In stepping switch position 2, the N—S go signal rest position, relay YR, tube YT and condenser KY time a predetermined minimum period at the end of which the stepping switch can be moved on into position 3 either by an E—W traffic actuation or by normal reversion.

The circuit connecting relay YR, tube YT and condenser KY in stepping switch position 2 is as follows. Relay YR thru wires 225, 224, wiper W3 and position 2 of bank SB3 is connected to condenser KY thru wires 229 and 258. In addition a charging circuit is established for condenser KY starting at grounded power to condenser KY, to wires 258, 229, position 2 of bank SB3, wiper W3, wires 224, 223, adjustable resistance RZ13, wire 213, position 2 of bank SB4, wiper W4, wire 226, contact *dm1* of driving magnet DM to D. C. plus power.

Wiper W3 is of the non-bridging type so that as the stepping switch moves from one position to the next there will be no interconnection of condenser circuits. Contact *dm1* is included in the charging circuit described above to prevent the plate of tube YT from being charged to flashover voltage during the instant that condenser KY is disconnected therefrom as wiper W3 moves from one stepping switch position to another.

The timing of the N—S minimum rest position period can be adjusted by regulating resistance RZ13 to control the charging rate of condenser KY in stepping switch position 2.

The grid circuit of tube YT in stepping switch position 2 is connected thru wire 259, wiper W5 and position 2 of bank SB5, wire 291 to potentiometer PZ5. Wiper W5 is of the bridging type to prevent fluctuations in grid potential as the stepping switch moves from one position to the next.

It will be noted that the resistance PZ7 and PZ6 are arranged in series across the D. C. plus and minus power terminals, and that the junction point of PZ7 and PZ6 is connected to the central vertical ground wire, thus providing a potentiometer arrangement in which ground potential and the left end of PZ6 are more positive than the right end, and various points on PZ6 may be tapped for different negative voltages with respect to ground. PZ4 and PZ5 are adapted to be individually connected between D. C. minus and ground, and when either is so connected it provides a potentiometer across the resistance PZ6. The negative end of potentiometer PZ5 is permanently connected to D. C. minus but the positive end of PZ5 is connected to ground thru a circuit including wire 254 and contact *bm6* of relay BM or E—W arterial switch Z69. Hence if both switch Z69 and contact *bm6* are open the potential of the grid of tube YT will be biased negative to such a degree that said tube will not break down even through plate condenser KY be charged to its maximum positive voltage. Therefore with contact *bm6* and switch Z69 open the stepping switch will remain at rest in position 2 even after condenser KY has become fully charged.

The above condition prevails if the system is not set for normal reversion to the E—W lane and there is no waiting E—W traffic. Under these conditions the stepping switch remains in position 2, its N—S rest position, and the go signal continues to be displayed in said N—S lane until the next E—W traffiv actuation occurs.

If normal reversion to the E—W lane is desired switch Z69 is closed which will make the grid potential of tube YT less negative so that the tube will "breakdown" and operate relay YR causing the stepping switch to move from position 2 to 3 as soon as condenser KY is sufficiently charged, i. e., at the expiration of the stepping switch position 2 minimum period. If switch Z69 is not so closed the movement of the stepping switch from position 2 to 3 will take place at any time after the expiration of said minimum period upon actuation of the E—W detector Z52 which will de-energize relay BM by opening its holding circuit at contact *fz1* of relay FZ. The de-energization of relay BM causes contact *bm6* to complete a circuit connecting potentiometer PZ5 to ground thus making the grid potential of tube YT much less negative so as to cause the tube to "break-down" and relay YR to operate, causing the stepping switch to move from position 2 to 3. If an actuation of detector Z52 takes place before the expiration of the rest position minimum period said stepping switch movement will take place at the end of this minimum period.

In stepping switch position 3 the N—S go signal and the E—W stop signal remain displayed and three timers, the normal vehicle interval timer, the variable vehicle interval timer and the maximum timer run concurrently. The first two of these timers are subject to reset by N—S detector actuations and the timing period of the variable vehicle interval timer is in addition shortened by waiting E—W traffic in accordance with the amount of such waiting E—W traffic. The maximum timer is not affected by traffic in either lane and sets a maximum limit beyond which N—S traffic cannot continue to hold the right of way against the cross lane.

The normal vehicle interval timer includes relay YR, tube YT and condenser KV. The grid of tube YT is in stepping switch position 3 connected to potentiometer PZ6 thru position 3 of bank SB5. The circuit from relay YR to wiper W3 of bank SB3 has been traced. Thru this bank, in position 3, condenser KV is connected to relay YR by wires 231, 232, 233 and 234.

Condenser KV, while the stepping switch was in positions 1 and 2, was being charged thru a circuit including grounded power to condenser KV, wires 234, 233, 232 and 230 to variable resistance RZ17, wire 238 contact *ar4* of relay AR to positive D. C. power. In stepping switch positions 1 and 2 condenser KV was also subject to discharge by N—S detector actuations thru contact *ez4* of relay EZ, wire 237, contact *ar2* of relay AR to ground. If, when the stepping switch enters position 3, the traffic in the N—S lane has cleared the intersection condenser KV will have had sufficient time since the last N—S detector actuation to become fully charged. In stepping switch position 3 condenser KV is connected to the plate of tube YT. Hence if this condenser is fully charged when the stepping switch moves into position 3 tube YT will immediately break down and operate relay YR to move the stepping switch on into position 4 with no appreciable stop in position 3. If on the other hand N—S detector actuations have recently discharged condenser KV the normal vehicle interval timer will continue its timing as long as the stepping switch remains in position 3.

The variable vehicle interval timer includes relay VVR, tube VVT, plate condenser KVV and, in stepping switch position 3, grid condenser KGNS. In stepping switch position 3 plate condenser KVV is charged thru a circuit from grounded power to condenser KVV, wire 263, 261, 222, 221, 220, variable resistance RZ4, wire 212 to position 3 of bank SB4, wiper W4, wire 226, contact *dm1* to D. C. plus power. Wiper W4 is of the non-bridging type to prevent interconnection of charging circuits during stepping switch movement. Contact *dm1* is included in this circuit to prevent tube flashover during the stepping switch movement as has been explained before.

Condenser KVV is subject to discharge upon actuation of N—S detector Z51 thru the circuit from grounded power to contact *ar6* of relay AR to contact *ez5* of relay EZ thru wire 240 which ties into the condenser KVV charging circuit at wire 222. The grid of tube VVT is connected to condenser KGNS thru the circuit including wire 249, contact *br5* of relay BR and wire 246 to condenser KGNS, thence to ground. The charge of condenser KGNS has in previous stepping switch positions been made less negative by the removal of increments of charge by condenser KBNS, one increment of charge being removed for each actuation of E—W detector Z52, so that the charge on condenser KGNS when the stepping switch is in position 3 has been reduced in accordance with the amount of waiting E—W traffic.

The circuits which accomplish the above results are as follows: In stepping switch positions 6 and 7 condenser KGNS is charged negatively thru the circuit from grounded power to condenser KGNS, wires 246, 247, contact *bm5*, variable resistor RZ20, wire 255 to potentiometer PZ6. The point at which wire 255 makes contact with potentiometer PZ6 fixes the maximum negative potential to which condenser KGNS can be charged by this circuit. The rate at which this charge takes place can be regulated by adjusting resistance RZ20.

The removal of increments of charge from condenser KGNS is accomplished as follows. In all stepping switch positions condenser KBNS is charged by condenser KGNS and then discharged to a predetermined potential once for each actuation of E—W detector Z52. This detector operates relay FZ whose contacts *fz6* and *fz7* are effective to accomplish the above as follows. With contact *fz7* closed condenser KBNS is discharged to a predetermined voltage thru the circuit including grounded power, condenser KBNS, wire 248, contact *fz7*, wire 250 to potentiometer PZ6. The voltage to which condenser KBNS is so discharged is regulated by setting the point at which wire 250 contacts potentiometer PZ6. A vehicle actuation of E—W detector Z52 opens this discharging circuit at contact *fz7* and connects condenser KBNS to condenser KGNS thru the direct circuit including contact *fz6*. The voltage on condenser KBNS, which was regulated to be less negative than that of condenser KGNS, will therefore cause the voltage on condenser KGNS to become less negative. Hence, when the stepping switch reaches position 3 the charge in condenser KGNS will have been reduced in accordance with the total of all the increments removed by condenser KBNS in response to E—W traffic actuations and substantially in accordance with the number of such E—W actuations since the right of way last left the E—W lane.

The fact that increments of charge are removed from condenser KGNS in response to E—W traffic actuations even during the E—W go signal display period provides a means whereby those E—W vehicles which, under heavy traffic conditions, are stopped by loss of the right of way after having actuated the E—W detector make their presence felt in decreasing the next N—S variable vehicle interval timing by means which will now be explained.

Since condenser KGNS in stepping switch position 3 acts as the grid condenser for tube VVT of the variable vehicle interval timer it follows that the time required for the plate condenser KVV to be charged to a voltage sufficient to cause tube VVT to break down, i. e., the variable vehicle interval, will be decreased substantially in accordance with the reduction of negative charge in condenser KGNS hence substantially in accordance with the amount of waiting E—W traffic.

When tube VVT does break down condenser KVV will discharge thru this tube and relay VVR thus energizing the driving magnet rectifier thru contact *vvr*2 and so move the stepping switch on into position 4. At the same time, thru the opening of contact *vvr*1 and thru the opening of contact *dm*2, which is opened by the operation of the driving magnet DM, both circuits which have previously been traced to the right side of the coil of relay AM are opened. Therefore relay AM will be released to put in a return right of way call.

When the variable vehicle interval relay VVR so acts to cause the stepping switch movement into position 4, it is obvious that its period had been reduced by waiting cross traffic to less than that of the normal vehicle interval timer. Hence the right of way return call put in by relay VVR is occasioned by the reduction of the variable vehicle interval by cross traffic to "less than a predetermined time".

If N—S traffic is heavy and N—S detector actuations repeatedly reset the normal vehicle interval timer and the variable vehicle interval timer, the maximum timer will after a predetermined time act to move the stepping switch into position 4 and so transfer the right of way from the N—S lane. The maximum timer consists of relay MXR, tube MXT and plate condenser KMX. In stepping switch position 3 condenser KMX is charged by a circuit from grounded power to condenser KMX, wire 268, thru variable resistance RZ2 to position 3 of bank SB6 thence thru wiper W6 to D. C. plus power. The timing of the maximum period can be regulated by varying resistance RZ2. When condenser KMX reaches a predetermined voltage tube MXT will break down and operate relay MXR by discharging condenser KMX thru the circuit from grounded power thru condenser KMX, wires 268, 269, coil of relay MXR, tube MXT, to ground.

The operation of relay MXR causes the stepping switch driving magnet rectifier to be energized thru contact *mxr*2 and so moves the stepping switch into position 4. At the same time, thru the operation of contacts *mxr*1 and *dm*2 both circuits previously traced to the right side of the coil of relay AM are opened. Relay AM is therefore de-energized to put in a N—S right of way return call. The fact that the transfer of the right of way was occasioned by the operation of the maximum timer relay MXR rather than by action of the normal vehicle interval timer indicates that a N—S detector had been actuated less than the operating period of the normal vehicle interval timer, i. e., "less than a predetermined time", previous to said transfer of the right of way, which condition it will be remembered is one under which a return right of way call is put in by this apparatus.

The de-energization of relay AM causes the return of the right of way to the N—S lane by moving the stepping switch out of the E—W rest position 6. This is accomplished as follows.

When relay AM is de-energized back contact *am*6 closes and connects the left terminal of potentiometer PZ4 to grounded power. When the stepping switch next reaches position 6 this will cause the grid potential of tube YT, which in this stepping switch position is connected to potentiometer PZ4 thru wire 259, wiper W5 and position 6 of bank SB5 and wire 257, to become less negative thereby permitting tube YT to become conductive when its plate condenser KY has been charged to a sufficient voltage. Condenser KY will thereupon discharge thru relay YR and so operate relay YR which will cause the driving magnet to move the stepping switch on into position 7. This operation was discussed in connection with the operation of the equivalent timing circuit when the stepping switch was in the N—S rest position 2.

As the stepping switch moves from position 3 to 4 condenser KY is discharged thru driving magnet contact *dm*3, condenser KVV is discharged thru contact *dm*4 and condenser KMX is discharged thru contact *dm*5 to prepare them for timing their next intervals In stepping switch position 4 the N—S go signal is extinguished and the N—S amber signal is illuminated. To accomplish this change relay BR is energized thru wiper W2 and position 4 of bank SB2. Contact *br*1 of relay BR being thereby closed light relay BLR is operated which extinguishes the N—S go signal Z45 by opening contact *blr*1 and illuminates the N—S amber signal Z46 by closure of contact *blr*2.

While the warning or stop signal is being displayed in the N—S lane, stepping switch in position 4, 5, 6, 7 or 8, relay AM, as previously explained, depends for its current on a holding circuit which includes contact *ez*1 of relay EZ. Therefore thru the opening of contact *ez*1 relay AM will be de-energized by a N—S vehicle actuation occurring during the N—S warning or stop signal display period. Relay AM will thereupon function to call the right of way to the N—S lane in the manner previously explained.

The N—S amber or warning period, stepping switch in position 4 is timed by relay YR, tube YT and condenser KY which is connected to plate circuit of tube YT thru relay YR and wiper W3 and position 4 of bank SB3.

Condenser KY is charged during this period thru a circuit from grounded power to condenser KY, wires 258, 228 position 4 and wiper W3 of bank SB3, wire 224, 223, variable resistance RZ1, wire 211, position 4 and wiper W4 of bank SB4, wire 226, contact *dm*1 to D. C. plus. The duration of the N—S amber period can be regulated by adjusting resistance RZ1 to control the charging rate of condenser KY during this period. The grid of tube YT is connected to potentiometer PZ6. When condenser KY is charged to a predetermined voltage tube YT will become conductive and discharge the energy of condenser KY thru relay YR thus operating the driving magnet DM to move the stepping switch into position 5.

Stepping switch positions 5, 6, 7 and 8 correspond respectively to positions 1, 2, 3 and 4 except that the go signal or the amber signal is being displayed to the E—W lane instead of the N—S lane and the functions of the N—S and E—W detectors are in general interchanged so that E—W actuations tend to extend the timing periods while the N—S actuations tend to decrease them.

In stepping switch position 5 relay AR is unoperated hence the N—S stop signal Z47 is illuminated thru contact *alr1* and the E—W go signal Z48 is illuminated thru contacts *blr4* and *alr3*. The E—W stop signal Z50 is extinguished by the opening of contact *alr2*.

The E—W initial interval, stepping switch in position 5, is timed by relay YR, tube YT and condenser KIEW just as the N—S initial interval is timed by the same relay and tube co-operating with condenser KINS. Condenser KIEW has been prepared for timing the E—W initial interval in accordance with the waiting E—W traffic by having its initial charge, introduced during the last E—W go signal period thru contact *bm4* and resistance RZ16, decreased during and subsequent to this charging period by the removal of charge increments by condenser KZ2 in response to E—W actuations, just as condenser KINS was prepared to time the N—S initial interval.

The removal of increments of charge from condenser KIEW by condenser KZ2 is accomplished thru contacts *fz2* and *fz3* of relay FZ. During the E—W initial interval condenser KIEW is recharged thru the circuit from ground to condenser KIEW, wire 203, position 5 and wiper W3 of bank SB3, wires 224, 223, 210, variable resistance RZ10, wire 215, position 5 and wiper W4 of bank SB4, wire 226 and contact *dm1* to D. C. plus power. At the end of the E—W initial interval, condenser KIEW having been recharged, tube YT becomes conducting and permits condenser KIEW to discharge thru wire 203, position 5 and wiper W3 of bank SB3, wires 224, 225, coil of relay YR and tube YT to ground. Relay YR thereupon operates and the stepping switch moves on into position 6, the E—W rest position.

When the stepping switch is in position 6 relay BM is operated. The circuits and functions of this relay are similar to those of relay AM except that they apply in general to the E—W lane instead of the N—S lane. It has an operating circuit from grounded power thru wiper W1 and position 6 of bank SB1, wires 209, 208 coil of relay BM, wires 207, 276, 277, 227, contact *dm2* to A. C. plus power. When relay BM operates an additional source of A. C. plus power thru a holding circuit independent of contact *dm2* is connected to the left side of the coil of relay BM thru wire 207, 276, 278, contact *bm2*, wire 279, contact *mxr1* and contact *vvr1* to A. C. plus power.

When relay BM operates an additional source of grounded power is connected to the right side of the coil of relay BM thru wire 208, contact *bm1* and *fz1* thence to grounded power. These last two described additional circuits taken together constitute a holding circuit similar to that previously described in connection with relay AM. The conditions under which this holding circuit will be broken to de-energize relay BM and so call the right of way to the E—W lane are similar to those effective in the case of the corresponding holding circuit associated with relay AM and will be described in detail later.

In stepping switch position 6, the E—W rest position, relay YR, tube YT and condenser KY co-operate to time a minimum period at the expiration of which the stepping switch can be moved on into position 7 by normal reversion if N—S arterial switch Z68 is closed or by an actuation of N—S detector Z51 just as it is moved into position 4 if switch Z69 is closed or E—W detector Z52 is actuated. In stepping switch position 6 the timing circuit is substantially the same as that effective in position 2 except that condenser KY is charged thru variable resistance RZ14 instead of variable resistance RZ13 and that the grid of tube YT is connected to potentiometer PZ4 instead of PZ5 thereby making the movement of the stepping switch out of position 6 dependent upon N—S arterial switch Z68 or N—S traffic thru de-energization of relay AM instead of E—W arterial switch Z69 or E—W traffic de-energization of relay BM.

In stepping switch position 7, the E—W traffic timed position, the normal vehicle interval timer, the variable vehicle interval timer and the maximum timer, run concurrently just as they did in the corresponding stepping switch position 3, the N—S traffic timed position. The charging circuit for condenser KV of the normal vehicle interval timer in stepping switch position 7 includes variable resistance RZ18 instead of variable resistance RZ17 which was in this circuit in stepping switch position 3. Likewise in the variable vehicle interval timer condenser KVV charging circuit resistance RZ9 replaces the corresponding resistance RZ4 and in the maximum timer condenser KMX charging circuit resistance RZ7 replaces the corresponding resistance RZ2. The substitution of these resistances permits the timing of the corresponding N—S and E—W intervals to be independently adjusted.

In stepping switch position 7 condenser KGEW is included in the grid circuit of variable vehicle interval timer tube VVT in place of condenser KGNS which was attached to the grid of tube VVT in stepping switch position 3. Grid condenser KGEW, while the stepping switch is in N—S go positions 2 and 3, is charged negatively thru the circuit from grounded power to condenser KGEW, wires 245, 244, contact *am5*, variable resistance RZ19, wire 256 to potentiometer resistance PZ6.

During and subsequent to the above charging period the negative charge in condenser KGEW is decreased by the withdrawal of an increment of charge by condenser KBEW thru the operation of contacts *ez6* and *ez7* of relay EZ, at each N—S detector actuation in order to decrease the E—W variable vehicle interval in accordance with the amount of waiting N—S traffic just as the N—S variable vehicle interval was decreased in accordance with the amount of waiting E—W traffic thru the removal of negative charges from condenser KGNS by condenser KBNS thru contacts *fz6* and *fz7* which has been previously explained.

As the stepping switch leaves position 7, if this movement is occasioned by variable vehicle interval timer relay VVR or by maximum timer relay MXR, relay BM will be deenergized to put in a call for the return of the right of way to the E—W lane just as relay AM was de-energized if either of these relays moved the stepping switch from position 3 to 4, which has previously been described. This de-energization of relay BM will result from the removal of A. C. plus power connections from its coil thru the opening of its holding circuit at contact *vvr1* of relay VVR or contact *mxr1* of relay MXR and the opening of its operating circuit at contact *dm2*, both of which circuits have been traced from A. C. plus power to the left side of the coil of relay BM.

If the stepping switch movement from position 7 to 8 is on the other hand occasioned by the operation of the normal vehicle interval timer relay YR relay BM will not be de-energized and hence no E—W return right of way call will be put in.

In those stepping switch positions in which the warning signal or the stop signal is being displayed to the E—W lane that part of the relay BM operating circuit including bank SB1 is open at this bank and the previously described parallel holding circuit including contact *fz1* of relay FZ and *bm1* of relay BM becomes the sole supply of current to the right side of the coil of relay BM. The first E—W detector actuation during the E—W stop or warning signal display period will open this holding circuit at contact *fz1* and de-energize relay BM thereby putting in a call for the return of the right of way to the E—W lane. Said return of the right of way will be occasioned by back contact *bm6* of relay BM completing to grounded power the circuit of potentiometer PZ5 thus when the stepping switch next reaches the N—S rest position 2 making less negative the potential of the grid of tube YT so that tube YT will break down when its plate condenser becomes sufficiently charged and operate relay YR to carry the stepping switch out of the said N—S rest position.

Stepping switch position 8 is the E—W amber or warning period position. Relay BR is de-energized in this position thus de-energizing light relay BLR also. Since relays AR and ALR are also de-energized in this stepping switch position the E—W go signal Z48 will be extinguished by the opening of contact *blr4* and the E—W amber signal Z49 will be illuminated thru the closure of contact *blr3*.

The duration of the E—W amber period is timed by delay YR, tube YT and condenser KY just as the N—S amber period was timed by them except that condenser charging resistance RZ6 replaces resistance RZ1 so that the timing of the E—W and N—S amber periods can be independently adjusted. When relay YR operates, driving magnet DM moves the stepping switch into position 1 at the same time discharging condenser KY thru contact *dm3* to prepare it for timing subsequent intervals. This completes the signal display cycle.

To summarize briefly, intervals are timed as follows by the apparatus of the second embodiment of my invention shown in Figs. 5 and 6.

The N—S initial interval, stepping switch in position 1, is timed by regular charging of condenser KINS which has previously been subject to the removal of unit charges by N—S traffic actuations. The replacement of these removed charges times this period in accordance with the amount of such waiting N—S traffic.

The E—W initial interval, stepping switch in position 5, is timed similarly by condenser KIEW from which unit charges have previously been removed by E—W traffic.

The N—S traffic timed right of way period, stepping switch in position 3, is timed concurrently by three timers, the normal vehicle interval timer, the variable vehicle interval timer, and the maximum timer.

The N—S normal vehicle interval is timed by regular charging of condenser KV subject to reset discharge by N—S traffic actuations. This condenser is being so charged and discharged in stepping switch position 2, the N—S rest position, so that the normal vehicle interval timer will be effective to move the stepping switch out of position 3 into position 4 thus transferring the right of way without delay if all N—S traffic has cleared the intersection when the stepping switch moves into position 3.

The N—S variable vehicle interval is timed by regular charging of condenser KVV which, in stepping switch position 3, is subject to reset discharge by N—S traffic actuations. At the same time the period of the variable vehicle interval timer is governed by the charge in condenser KGNS which has been previously regulated in accordance with E—W traffic actuations.

The E—W traffic timed right of way period, stepping switch in position 7, is similarly timed by the same three timers. However, in the variable vehicle interval timer condenser KGEW replaces condenser KGNS so that the period of the variable vehicle interval timer when timing the E—W lane will be governed by waiting N—S traffic.

Figure 7 is a schematic diagram showing one form of special traffic detector by means of which preferred forms of traffic such as trolley cars or fire apparatus can exert a multiple effect, the equivalent of that produced by several ordinary traffic actuations, in order to practically preempt the right of way by drastically reducing the variable vehicle interval or to emphasize the effect of such preferred traffic in lengthening the initial interval.

The relay shown in Fig. 7 has a special type of armature composed of a rigid member 294 and an elastic member 297 to the free end of which is affixed weight 299 which is made of electrically conductive material such as copper in which eddy currents will be induced as this weight moves thru the magnetic field established by electromagnet 306. Member 294 of this armature is normally held against back-stop 295 by spring 305, in which condition contacts 296 and 298 are both open as shown.

Contact 292 is a special contact arranged to be actuated only by preferred traffic. In the case where trolley cars are to be accorded such preferential treatment 292 could be a contactor arranged to be operated by an approaching trolley car. A special detector of the sound actuated type responsive only to the shrill, high pitched tone of a siren such as is commonly used on fire apparatus and other emergency vehicles, said detector arranged to respond only when such a siren is operated in its immediate vicinity or more particularly directly into its sound receiver could be provided and be arranged to close a contact such as 292 when actuated by the siren of an emergency vehicle approaching the intersection in the lane wherein said sound detector is located.

Wires 301 and 200 lead to the ordinary detector circuit in the traffic lane in which the special detector is located and are connected to this regular detector circuit in such a way that the closure of contact 296 or 298 produce the same effect as one actuation of said regular detector.

The operation of special contact 292 energizes relay coil 293 which thereupon attracts armature 294, which will revolve around 304 and close contact 296. In this position of armature 294 weight 299 will rest against stop 300. When special contact 292 returns to its unoperated condition armature 294 will be released and will return to its unoperated position in which contact 296 is open, armature 294 being held against back stop 295 by spring 305. Weight 299 will thereupon cause elastic member 297 to vibrate back and forth thus alternately closing and opening contact 298 a predetermined number of times said number being dependent upon the damping effect of the eddy currents induced in weight 299. The magnitude of these eddy currents can be increased or decreased by varying the strength of the magnetic field produced by electromagnet 306. Variable resistance 307 is adjustable to regulate the current supplied to electromagnet 306 by battery 308 and so regulate the magnitude of the magnetic field produced by electromagnet 306 in order to control its damping effect on weight 298 and so fix the number of times that contact 288 will be opened and closed by an actuation of special contact 292. From the above description it can be seen that by actuating special contact 292 a vehicle of preferred classification will have the same effect on the signal timing as a predetermined number of ordinary vehicles in the lane wherein the special contact is located.

The purpose of my invention is to provide traffic controlled apparatus suitable for handling either light or heavy traffic but especially designed to handle with the utmost efficiency very heavy traffic flows.

The purpose outlined above is accomplished by this apparatus through means whereby waiting traffic, in accordance with its volume, exerts increasing pressure to force the transfer of the right of way to itself and means whereby moving traffic also is protected by providing a minimum right of way period of proper length.

The apparatus further provides means whereby certain preferred forms of traffic, the rapid movement of which is essential in the interest of maximum efficiency, can exert more pressure to this end than does ordinary traffic.

Means are also provided whereby efficiently moving traffic can hold its right of way and so preclude unwarranted interruption thereof.

In apportioning the right of way time between the two streets this apparatus balances the increasing pressure exerted by accumulating waiting traffic against the "holding power" of moving traffic in order to bestow the right of way where it will be most effectively used.

A considerable degree of co-ordination among adjacent intersections can be brought about without the use of electrical interconnection by adjusting the apparatus at each intersection to emphasize the preemptory effect of a large group of vehicles to seize the right of way thereby facilitating the passage of such a group thru intersection after intersection solely by virtue of its power to preempt the right of way.

While in the above description the application of my invention to one form of traffic control system has been set forth and two embodiments of my invention have been illustrated, it will be obvious to those skilled in the art that the invention may take many forms and may be applied to many types of traffic control systems, and it is not intended to limit my invention to the particular embodiments illustrated. It will be appreciated that numerous changes in construction and rearrangement of parts with respect to the construction of the timer, of the time adjustment means, of the traffic responsive means, and in the mode of installation and point of application of these several means might be resorted to without departing from the spirit of the invention as defined by the claims.

I claim:

1. In a traffic control system for use at the intersection of two lanes including "stop" and "go" signals adapted to be displayed to the traffic thereon, vehicle actuated means in both lanes, means for according right-of-way alternately to the two lanes including means for timing the display period of a "go" signal to one lane and a "stop" signal to the other lane and means included in said timing means for extending the display period of the "go" signal in said one lane by a small increment of time in response to each actuation of the vehicle actuated means in said one lane during the display of the "go" signal therein and means included in said timing means for decreasing the amount of such increment of extension of said "go" signal display period, in response to actuation of the vehicle actuated means in said other lane while the "stop" signal is being displayed therein.

2. In a traffic control system for interfering traffic lanes having a right of way signal and a timing mechanism adapted to operate said signal to accord right of way successively to said lanes, means responsive to a single actuation by traffic in one lane while right of way is accorded to said one lane to prolong such right of way for a time period, and means responsive to traffic in a second lane while right of way is so accorded to said one lane to reduce said time period by an increasing amount in accordance with increasing amount of traffic on said second lane.

3. In a traffic control system for interfering traffic lanes having a right of way signal and a timing mechanism adapted to operate said signal to accord right of way successively to said lanes, means responsive to passage of each element of traffic in one lane while right of way is accorded to said one lane to prolong such right of way for a time period from each such passage, and means responsive to traffic in a second lane to reduce said time period by an increasing amount in accordance with increasing amount of traffic on said second lane while right of way is so accorded to said one lane.

4. In a traffic control system for interfering traffic lanes having a right of way signal and a mechanism adapted to operate said signal to accord right of way successively to the lanes, timing means forming a part of said mechanism and operating when right of way is accorded to said one lane to start timing a period and to cause termination of such accord of right of way at the end of its time period, means responsive to passage of a plurality of successive vehicles within predetermined time spacing of each other less than said time period in said one lane to repeatedly reset said timing means to restart its timing and thus to cause successive prolongation of right of way by such time period in said one lane, and means responsive to traffic in a second lane to reduce said time period whereby termination of right of way in said one lane will occur at a smaller time spacing of vehicles.

5. In a traffic control system for interfering traffic lanes having a right of way signal and a mechanism adapted to operate said signal to accord right of way successively to the lanes, timing means forming a part of said mechanism and operating when right of way is accorded to said one lane to cause termination of such accord of right of way at the end of its time period, means responsive to passage of a plurality of successive vehicles within predetermined time spacing of each other less than said time period in said one lane to repeatedly reset said timing means to cause successive prolongation of right of way by such time period in said one lane, a maximum timing means forming a part of said mechanism and operating to provide a maximum limit to such prolongation of right of way, and means responsive to traffic in a second lane to reduce said time period whereby termination of right of way in said one lane will occur at a smaller time spacing of vehicles prior to such maximum limit.

6. In a traffic control system for interfering traffic lanes having a right of way signal and a mechanism adapted to operate said signal to accord right of way successively to the lanes, timing means forming a part of said mechanism and operating when right of way is accorded to one lane to cause termination of such accord of right of way at the end of its time period, means responsive to passage of a plurality of successive vehicles within predetermined time spacing of each other less than said time period in said one lane to repeatedly reset said timing means to cause successive prolongation of right of way by such time period in said one lane, a maximum timing means forming a part of said mechanism and operating to provide a maximum limit to such prolongation of right of way, and means responsive to vehicles in a second lane to reduce said time period progressively as the number of vehicles increases in said second lane.

7. In a traffic control system for interfering traffic lanes having a right of way signal and a mechanism adapted to operate said signal to accord right of way successively to the lanes, timing means forming a part of said mechanism and operating when right of way is accorded to said one lane to cause termination of such accord of right of way at the end of its time period and to transfer right of way to a second lane at such termination when said mechanism is potentialized for such transfer, means responsive to passage of a plurality of successive vehicles within predetermined time spacing of each other less than said time period in said one lane to repeatedly reset said timing means to cause prolongation of right of way in said one lane, a maximum timing means forming a part of said mechanism and operating to provide a maximum limit to such prolongation of right of way, and means responsive to vehicles arriving in said second lane while right of way is accorded to said one lane and interrupted in said second lane to potentialize said mechanism for transfer of right of way to said second lane and to reduce progressively said time period so much as to cause termination of right of way in said one lane and transfer of right of way to said second lane substantially immediately upon the arrivel of a predetermined number of vehicles in said second lane.

8. In a traffic control system for interfering traffic lanes having a right of way signal and a mechanism adapted to operate said signal to accord right of way successively to the lanes in response to actuation by traffic in the respective lanes, timing means forming a part of said mechanism and operating when right of way is accorded to said one lane to cause termination of such accord of right of way at the end of its time period, means responsive to passage of a plurality of successive vehicles within predetermined time spacing of each other less than said time period in said one lane to repeatedly reset said timing means to cause successive prolongation of right of way by such time period in said one lane, a maximum timing means forming a part of said mechanism and operating to provide a maximum limit to such prolongation of right of way, and means responsive to traffic in a second lane to reduce said time period whereby termination of right of way in said one lane will occur at a smaller time spacing of vehicles and means to actuate said mechanism to assure accord of right of way subsequently to said one lane after a period of right of way on said second lane, independently of subsequent traffic actuation of the traffic responsive means of said one lane, in the event that right of way is terminated in said one lane with said time period reduced below a certain value.

9. In a traffic control system for use at the intersection of two lanes including "stop" and "go" signals adapted to be displayed to the traffic thereon, vehicle actuated means in both lanes, means for according the right of way alternately to the two lanes including means for timing the display period of a "go" signal to one lane and a "stop" signal to the other lane and means included in said timing means for extending the display period of the "go" signal in said one lane by a small increment of time in response to actuation of the vehicle actuated means in said one lane during the display of the "go" signal therein and means included in said timing means for decreasing the amount of such increment of extension of said "go" signal display period in response to actuation of the vehicle actuated means in said other lane while the stop signal is being displayed in the latter lane, said decrease in the amount of the "go" signal display period extension being substantially in accordance with the number of such actuations of the vehicle actuated means in the said other lane during the "stop" signal display period in said other lane.

10. In a traffic control system for use at the intersection of two lanes including "stop" and "go" signals adapted to be displayed to the traffic thereon, vehicle actuated means in both lanes, means for according the right of way alternately to the two lanes including means for timing the display period of a "go" signal to one lane and a "stop" signal to the other lane and means included in said timing means for extending the display period of the "go" signal in said one lane by a small increment of time in response to actuation of the vehicle actuated means in said one lane during the display of the "go" signal therein and means included in said timing means for decreasing the amount of such increment of extension of said "go" signal display period in response to actuation of the vehicle actuated means in said other lane substantially in accordance with the amount of traffic which has actuated the vehicle actuated means shortly prior to the display of the "stop" signal in said other lane and which was subsequently stopped by the display of said "stop" signal in said other lane.

11. In a traffic control system for interfering traffic lanes having a right of way signal and a mechanism adapted to operate said signal to accord right of way successively to the lanes, timing means forming a part of said mechanism and operating when right of way is accorded to said one lane to cause termination of such accord of right of way at the end of its time period, means responsive to passage of a plurality of successive vehicles within predetermined time spacing of each other less than said time period in said one lane to repeatedly reset said timing means to cause successive prolongation of right of way by such time period in said one lane, a maximum timing means forming a part of said mechanism and operating to provide a maximum limit to such prolongation of right of way, and means responsive to vehicles in a second lane to reduce said time period progressively as the number of vehicles increases in said second lane and means responsive solely to a single vehicle to which preference is desired to be given in the second lane to produce the effect of a plurality of vehicles in said lane in reducing said time period in said one lane.

12. In a traffic control system for use at the intersection of two lanes including "stop" and "go" signals adapted to be displayed to the traffic thereon, vehicle actuated means in both lanes, means for timing the display period of said signals including a relay with two opposing coils said relay being operative by differential current energization of said coils to a predetermined extent to terminate said period and means in said timing means and including a three element thermionic tube having an anode-cathode circuit connected through said first coil and a grid for controlling the current in said anode-cathode circuit, and means connected with said grid in said display period for progressively increasing the current for energizing said first coil and operative to extend the display of the "go" signal in one lane for a time period in response to the vehicle actuated means in said lane during the display of the "go" signal therein, and means in said timing means including a second three element thermionic tube having an anode-cathode circuit connected through the other said coil and a grid for controlling the current in said anode-cathode circuit, and means connected with said grid in said display period for progressively decreasing the current for energizing the other said coil in opposition to said first coil to decrease such extension of the time period in response to the vehicle actuated means in the said other lane in which the "stop" signal is being displayed.

13. In a traffic control system for use at the intersection of two lanes including "stop" and "go" signals adapted to be displayed to the traffic thereon, vehicle actuated means in both lanes, means for timing the display period of a "go" signal to one lane while a "stop" signal is displayed to the other lane and including a gas discharge tube having an anode and a cathode with a biased grid for controlling the voltage at which conduction takes place between the cathode and anode, a condenser connected to regulate the potential difference between the said anode and cathode and means for varying the voltage of said condenser from an initial to a final value above such conduction voltage, means employing such conduction between said anode and cathode to cause the said "go" signal to cease to be displayed in said one lane when the said condenser reaches said final voltage, means responsive to the traffic actuatable means in the said one lane to vary the voltage on the said condenser toward its initial value and so cause the said "go" signal to continue to be displayed in said one lane for a time period and means responsive to the traffic actuatable means in the other lane to vary the said grid bias to determine the said time period during which said "go" signal continues to be displayed in said one lane.

14. In a traffic control system for the intersection of interfering traffic lanes having a right of way control signal, traffic actuatable means in the lanes, control mechanism for governing the signal to accord right of way to one lane and the other alternately, timing means to time a period of right of way display to one lane in response to actuation of the traffic actuatable means in said one lane and to terminate the period by operating the control mechanism at the end of the period so timed, said timing means including a condenser, means for charging the condenser from an initial charge at a slow rate, and means responsive to a predetermined charge on said condenser for terminating the time period, and means associated with the timing means and responsive to actuations of said traffic actuatable means during the last prior right of way period on said other lane to predetermine the length of said time period by determining said initial charge at the commencement of said period.

15. In a traffic control system for the intersection of interfering traffic lanes having a right-of-way control signal, traffic actuatable means in the lanes, control mechanism for governing the signal to accord right of way to one lane and the other alternately, timing means to time a period of right of way display to one lane in response to actuation of the traffic actuatable means in said one lane and to terminate the period by operating the control mechanism at the end of the period so timed, said timing means including a condenser, means for charging the condenser from an initial charge at a slow rate, and means responsive to a predetermined charge on said condenser for terminating the time period, means for providing said condenser normally during the last prior right-of-way period on said one lane with a high value of charge for said initial charge, and further means responsive to actuations of said traffic actuatable means during the last prior right of way periods on said lane and on said other lane for reducing said charge to determine said initial charge and thus determine the length of said time period substantially in accordance with such actuations.

16. In a traffic control system for use at the intersection of two lanes including "stop" and "go" signals adapted to be displayed alternately to the traffic thereon, vehicle actuated means in one of said lanes, cyclic switching means having a plurality of operating positions through which it is operable, means for changing the display of said signs, timing means to measure a time period while one of said signals is displayed and to operate said changing means at the end of said time period, said timing means including a condenser, means to vary the voltage thereon progressively from an initial value toward a different final value during the said time period to determine said period and means included in said timing means and operative when said condenser voltage reaches said final value to operate said cyclic switching means from one position to another, and means responsive to actuation of the vehicle actuated means prior to display of said one signal to control said initial voltage value on said condenser when said one signal is displayed.

17. In a traffic control system for two interfering traffic lanes including a right of way signal therefor and means for operating said signal to change right of way alternately between the lanes, an electron discharge tube having an anode, cathode and grid, timing means including the anode and cathode of said tube and acting to vary the anode-cathode current over a time period and to operate said signal operating means when the anode-cathode current is of a predetermined value, and means actuated by traffic in one of the lanes for varying the grid potential for controlling said current whereby the time period between signal changes will be controlled.

18. In a traffic control system for use at the intersection of two lanes including "stop" and "go" signals adapted to be displayed to the traffic thereon, vehicle actuated means in both lanes, means for timing the display of a "go" signal to one lane while a "stop" signal is displayed to the other lane and including a relay having two coils, the first coil for operating the relay when sufficiently energized to terminate said display and the second coil energized for opposing the first to require greater energization to operate said relay, means for progressively increasing energization of said first coil during said signal display to time the period of display, means cooperable with said first coil by decreasing substantially such energization of said first coil and restarting such progressive increase of energization to extend the display of the "go" signal in said one lane in response to actuation of the vehicle actuated means in said one lane during the display of the "go" signal therein, and means cooperable with said second coil by decreasing energization of the latter to decrease its opposition to the first coil and thus to decrease the amount of such extension.

19. In a traffic control system for use at the intersection of two lanes including "stop" and "go" signals adapted to be displayed to the traffic thereon, vehicle actuated means in both lanes, means for timing the display of a "go" signal to one lane while a "stop" signal is displayed to the other lane and including a relay having two coils, the first coil for operating the relay when sufficiently energized to terminate said display and the second coil energized for opposing energization of the relay by the first coil, means for progressively increasing energization of said first coil during said signal display to time the period of said signal display, means cooperable with said first coil by decreasing substantially such energization of said first coil and restarting such progressive increase of energization to extend the display of the "go" signal in one lane in response to actuation of the vehicle actuated means in said one lane during such display of the "go" signal therein, and means cooperable with said second coil to decrease energization of the latter to decrease the amount of such extension in response to actuation of the vehicle actuated means in the lane in which the "stop" signal is being displayed.

20. In a traffic control system for interfering traffic lanes having a right of way signal and a mechanism adapted to operate said signal to accord right of way successively to the lanes, timing means forming a part of said mechanism and operating when right of way is accorded to said one lane to cause termination of such accord of right of way at the end of its time period, means responsive to passage of a plurality of successive vehicles within predetermined time spacing of each other less than said time period in said one lane to repeatedly reset said timing means to cause successive prolongation of right of way by such time period in said one lane, a maximum timing means forming a part of said mechanism and operating to provide a maximum limit to such prolongation of right of way, and means responsive to vehicles in a second lane to reduce said time period progressively at a rapid rate as the number of vehicles increases in said second lane so as to cause immediate termination of right of way in said one lane and transfer to said second lane upon actuation by a predetermined number of such vehicles as said time period will be reduced below the time spacing of vehicles in said one lane, and means responsive solely to a single vehicle to which preference is desired to be given in the second lane to produce the effect of such predetermined number of vehicles in said second lane to cause substantially immediate transfer of right of way to said second lane.

21. In a traffic control system for at least two interfering traffic lanes having signals indicating when traffic is to "go" and "stop" respectively in the respective lanes and means actuated by traffic in the respective lanes and a time controlled mechanism for operating said signals to display the "go" signal alternately to the respective lanes for time periods variable in accordance with actuation of said means by traffic on the respective lanes, a signal switching device forming a part of said mechanism having a plurality of positions through which it is adapted to be operated cyclically to so operate said signals and including at least one position for displaying a "go" signal to one lane and a "stop" signal to the other lane and at least one other position for displaying a "go" signal to said other lane and a "stop" signal to the first lane, a timing device forming a part of said mechanism for determining the time said mechanism is in said one position before it is operated to said other position, said timing device comprising a condenser, means for varying the charge on said condenser progressively from an initial value to a different final value, means responsive to such final value of charge on said condenser to operate said switching device to shift the latter from said one position to said other position, means associated with said switching device for connecting the traffic actuated means for said one lane to said condenser in said one position to vary the charge toward said initial value from any value between said initial and final values in response to actuation by traffic in said one lane, and further means associated with the switching device for connecting the traffic actuated means for the other lane to said charge responsive means in said one position of said switching device to vary the value of charge to which it is responsive from such final value toward such initial value in response to actuation by traffic in said other lane.

22. In a traffic control system for at least two interfering traffic lanes having signals indicating when traffic is to go and stop respectively in the respective lanes and a time controlled mechanism for operating said signals to display the "go" signal alternately to the respective lanes for time periods variable in accordance with actuation by traffic on the respective lanes, a signal switching device forming a part of said mechanism and having a plurality of positions through which it is adapted to be operated cyclically to so operate said signals and including at least one position for displaying a "go" signal to one lane and a "stop" signal to the other lane, and at least one other position for displaying a "go" signal to said other lane and a "stop" signal to the first lane, a timing device forming a part of said mechanism for determining the time said mechanism is in said one position before it is operated to said other position, said timing device comprising a condenser, a charging circuit for said condenser including a high resistance, a thermionic vacuum tube having an anode, a cathode and a grid and in which the current between anode and cathode varies in accordance with the grid voltage in relation to the cathode, a relay having an operating coil and a bucking coil, a circuit connecting said condenser between the grid and cathode of said tube so as to cause the anode-cathode current to increase with increase in charge on said condenser, a circuit including said operating coil and the anode and cathode of said tube, a discharge circuit for said condenser including connection by means of said switching device to said traffic actuated means for said one lane to complete said discharge circuit momentarily to discharge said condenser by traffic actuation in said one position of said switching device, a second thermionic tube similar to the first, a circuit including said bucking coil and the anode and cathode of said second tube, a control circuit for the grid of said second tube including a second condenser and connected by means of said switching device to the traffic actuated means for the other lane to control the charge on the said second condenser in accordance with traffic actuation on said other lane in said one position of said switching device to reduce the voltage of the grid with relation to the cathode in said second tube, so as to reduce the anode-cathode current of said second tube, and means operated by said relay to operate said switching device from said one position to said other position.

23. A traffic control system for interfering traffic lanes having circuits including signals to indicate right of way to the respective lanes, a switching device having a plurality of contacts including contacts in said signal circuits and having a plurality of positions through which it is adapted to be operated to operate said contacts to switch alternately between the right of way signal circuits for the respective lanes with at least one position for energizing the right of way signal circuit for one lane and one other position for energizing the right of way signal circuit for the other lane, traffic actuated switch means for the respective lanes, an electric condenser, a charging circuit for said condenser including a high resistance and one of said contacts closed in said one position, a discharge circuit for said condenser including a low resistance and one of said contacts closed in said one position and also including the traffic actuated switch means for said one lane to discharge said condenser momentarily by traffic actuation in said one lane in said one position, a gas discharge tube having an anode and cathode and control grid in which the negative bias of the grid with respect to the cathode controls the threshold conduction voltage for current between anode and cathode, a second discharge circuit for said condenser including a relay and the anode and cathode of said tube, a second condenser, a circuit including one of said contacts closed in said one position to connect said second condenser to said grid to determine such bias and conduction voltage, means including a circuit closed in at least said one position for connecting said second condenser and the traffic actuated switch means for the other lane to vary the charge on said second condenser so as to reduce the grid bias of said tube and the threshold conduction voltage in response to traffic actuation on said other lane, and means operated by said relay for operating said switching device from said one position to said other position.

HARRY A. WILCOX.